(12) United States Patent
Palmer et al.

(10) Patent No.: US 6,259,444 B1
(45) Date of Patent: *Jul. 10, 2001

(54) USER-DEFINABLE INTERACTIVE SYSTEM

(75) Inventors: Douglas L. Palmer, Foothill Ranch; Richard Douglas Ray, Laguna Niguel, both of CA (US)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,844

(22) Filed: Apr. 4, 1997

Related U.S. Application Data

(63) Continuation of application No. 08/161,811, filed on Dec. 6, 1993, now abandoned.

(51) Int. Cl.[7] .......................................... G06F 3/14
(52) U.S. Cl. ............................. 345/333; 345/326
(58) Field of Search ..................... 395/326, 327, 395/328, 329, 330, 331, 332, 333, 334, 335, 339, 340, 348, 352; 379/1, 111, 188; 345/326–335, 339, 340, 349, 352

(56) References Cited

U.S. PATENT DOCUMENTS

| 4,656,603 | 4/1987 | Dunn | 364/900 |
|---|---|---|---|
| 4,755,932 | 7/1988 | Diedrich | 364/200 |
| 4,821,211 | 4/1989 | Torres | 364/521 |
| 4,942,540 | 7/1990 | Black et al. | 364/514 |

(List continued on next page.)

FOREIGN PATENT DOCUMENTS

| 451963 | 10/1991 | (EP) . |
|---|---|---|
| 513553 | 11/1992 | (EP) . |
| 4-107629 | 4/1992 | (JP) . |
| 4-112258 | 4/1992 | (JP) . |

OTHER PUBLICATIONS

Repenning, Alex, "Agentsheets: A Tool for Building Domain–Oriented Visual Programming Environments", INTERCHI '93, pp. 142, 143 (Apr. 24–29, 1993).

VASE™ (Voice Application Simulation Environment) Entry System, Sales Brochure of Infologue, Inc.

(List continued on next page.)

*Primary Examiner*—Ruay Lian Ho
(74) *Attorney, Agent, or Firm*—Fitzpatrick, Cella, Harper & Scinto

(57) ABSTRACT

Method and apparatus for creating, editing, and processing an interactive system made up of event-actuated action items. In one aspect, an event interpreter for selecting action items for execution based on occurrences of events in an interactive system includes an input section by which the event interpreter receives a computer-usable signal indicating that an event has occurred, an event name generator for generating an event name based on the computer-usable signal, and an application selector for comparing the event name to the event identifier for action items stored in a file system and for selecting for execution an action item whose event identifier corresponds to the event name. In another aspect, the action items of the interactive system are displayed hierarchically using the file system editor. In this aspect of the invention, an interactive system application containing at least one event-actuatable action item is selected from the file system, a graphical representation of the at least one event-actuatable action item is displayed in a hierarchical arrangement, and an event identifier associated with the displayed action item of the selected interactive system application is displayed. The associated event identifier actuates the action item in response to the occurrence of a physical event corresponding to the event identifier.

94 Claims, 14 Drawing Sheets

U.S. PATENT DOCUMENTS

| | | | |
|---|---|---|---|
| 5,021,976 | | 6/1991 | Wexelblat et al. ............... 364/521 |
| 5,041,992 | | 8/1991 | Cunningham et al. ............ 364/518 |
| 5,086,385 | * | 2/1992 | Launey et al. .................... 364/188 |
| 5,117,372 | | 5/1992 | Petty ................................. 395/161 |
| 5,136,631 | | 8/1992 | Einhorn et al. ..................... 379/67 |
| 5,140,677 | | 8/1992 | Fleming et al. ................... 395/159 |
| 5,155,806 | | 10/1992 | Hoeber et al. .................... 395/157 |
| 5,214,756 | | 5/1993 | Franklin et al. ................... 395/159 |
| 5,220,675 | | 6/1993 | Padawer et al. ................... 395/800 |
| 5,226,040 | * | 7/1993 | Novel, IV et al. .................. 370/56 |
| 5,237,684 | * | 8/1993 | Record et al. ..................... 395/650 |
| 5,241,588 | | 8/1993 | Babson, III et al. ............... 379/201 |
| 5,301,275 | * | 4/1994 | Vanbuskirk et al. .............. 395/250 |
| 5,305,454 | * | 4/1994 | Record et al. ..................... 395/650 |
| 5,319,754 | * | 6/1994 | Meinecke et al. ................. 395/325 |
| 5,355,484 | * | 10/1994 | Record et al. ..................... 395/650 |

OTHER PUBLICATIONS

VoiceKit™, Sales Brochure of Winters Development (1992).

Multi_ComBoard™, Sales Brochure of Speaking Devices Corporation (1992).

"Automatic Information Retrieve by Voice & Fax", Sales Brochure of Speaking Devices Corporation.

"Multi_ComBoard™ Voice Mail, AutoAttendant & Call Processor", Sales Brochure of Speaking Devices Corporation.

$FAX^{stf}$ ™ for the Macintosh™, Sales Brochure of STF Technologies, Inc.

FACTSLINK® Sales Brochure of Voicelink, Inc.

Open+Voice, "Voice, fax, and data applications made easy", Sales Brochure of Open+Voice, Inc.

"Expert Sysems' Ease", Teleconnect (Jan. 1992).

"IVR Software Players", Computer Telephony, pp.60–64 (Fall 1993).

Phone Office, Sales Brochure of Edens Technology Corp.

Show N Tel Sales Brochure.

* cited by examiner

USER-DEFINABLE INTERACTIVE SYSTEM

This application is a continuation of application Ser. No. 08/161,811 filed Dec. 6, 1993, abandoned.

BACKGROUND OF THE INVENTION

1. Field of the Invention

The present invention concerns a computer-implemented interactive system in which a computer can react to the occurrence of physical events by selecting and processing a stored action item so as to cause additional data processing or a controlled hardware response. More specifically, the invention is directed to an event interpreter which, based on the physical event, selects and processes an action item from a collection of action items which together form the interactive system, as well as to a method which uses the computer file system to create, modify and view the action items in the interactive system.

2. Description of the Related Art

Computer-controlled interactive systems allow a computer to sense the occurrence of a physical event and to react to the physical event in accordance with a stored application of predefined responses, such as by performing specific data processing or by controlling hardware equipment. For example, in the case of an interactive voice response (IVR) system, a computer can sense the occurrence of an incoming call, respond by controlling the telephone to go off-hook and by playing out a series of user options, and can then sense the occurrence of dual tone modulated frequency (DTMF) tone commands from the caller and respond with appropriate data processing and telephone hardware control sequences.

Because of the complexity of interactive systems, they are ordinarily designed by highly trained software engineers using sophisticated and complicated software programming techniques. And, because the interactive systems must be created to an end user's specifications, most interactive systems are customized to that single user's requirements and cannot easily be tailored to other user's requirements. Thus, once an interactive system has been designed and coded, if changes are required, then either a new system must be written or the old system must be revised by highly trained software engineers at great expense.

Recently, some interactive systems have become available which allow their owner to make minor modifications on his own. However, in these cases the modification capability is itself a new program which the owner must learn and, once learned, it can only be used to modify the interactive system and not for any other purpose.

Thus, current modification capabilities are specifically tailored for their associated interactive systems and cannot be used flexibly for other interactive systems.

SUMMARY OF THE INVENTION

The present invention addresses the above-noted drawback by allowing the owner to use the presenter/editor in the computer's file system, which is the same file system by which all files on the computer are created and modified and viewed, to create, modify and view the interactive system. According to this aspect of the invention, a method for visually representing content and structure of an interactive system application stored in a file system includes the steps of selecting from the file system an interactive system application containing at least one event-actuatable action item, displaying, in a hierarchical arrangement, a graphical representation of the at least one event-actuatable action item, and displaying an event identifier associated with the displayed action item of the selected interactive system application, wherein physical occurrences of an event corresponding to the event identifier causes actuation of the action item.

According to another aspect, the invention provides an event interpreter which controls processing of the interactive system by matching names of events to an event identifier of action items which comprise the interactive system, and by processing action items which are selected when a match is found. According to this aspect, an event interpreter for selecting action items for execution based on occurrences of events in an interactive system includes an input section by which the event interpreter receives a computer-usable signal indicating that a physical event has occurred, an event name generator for generating an event name based on the computer-usable signal, and an action item selector for comparing the event name to the event identifier for action items stored in a file system and for selecting for execution an action item whose event identifier corresponds to the event name.

According to another aspect of the present invention, an interactive system for monitoring and for responding to physical events includes a file system which includes a plurality of action items, each action item having an identifier corresponding to a physical event monitored in the interactive system. A physical event interface detecting an occurrence of a physical event and outputs a signal in response to the occurrence of an event. A name generator receives the signal from the physical event interface and generates an event name based on the received signal. An event interpreter selects and processes an action item from the file system, the action item having an event identifier corresponding to the generated event name.

In yet a further aspect of the invention, there is a method for visually representing content and structure of an interactive system using a conventional file system. In the method, an interactive system application containing at least one event-actuatable action item is selected from the file system. A graphical representation of the at least one event-actuatable action item is displayed in a hierarchical arrangement, and an event identifier associated with the at least one action item is displayed. The event identifier operates to actuate the at least one action item upon the occurrence of an event having a corresponding event name to the event identifier.

This brief summary of the invention is provided so that the nature of the invention may be understood quickly. A full understanding may be obtained by reference to the following detailed description of the invention in connection with the appended drawings.

BRIEF DESCRIPTION OF THE DRAWINGS

FIG. 6, comprising

FIG. 11, comprising FIG. 12, comprising

DETAILED DESCRIPTION OF THE PREFERRED EMBODIMENT

Figure 1:
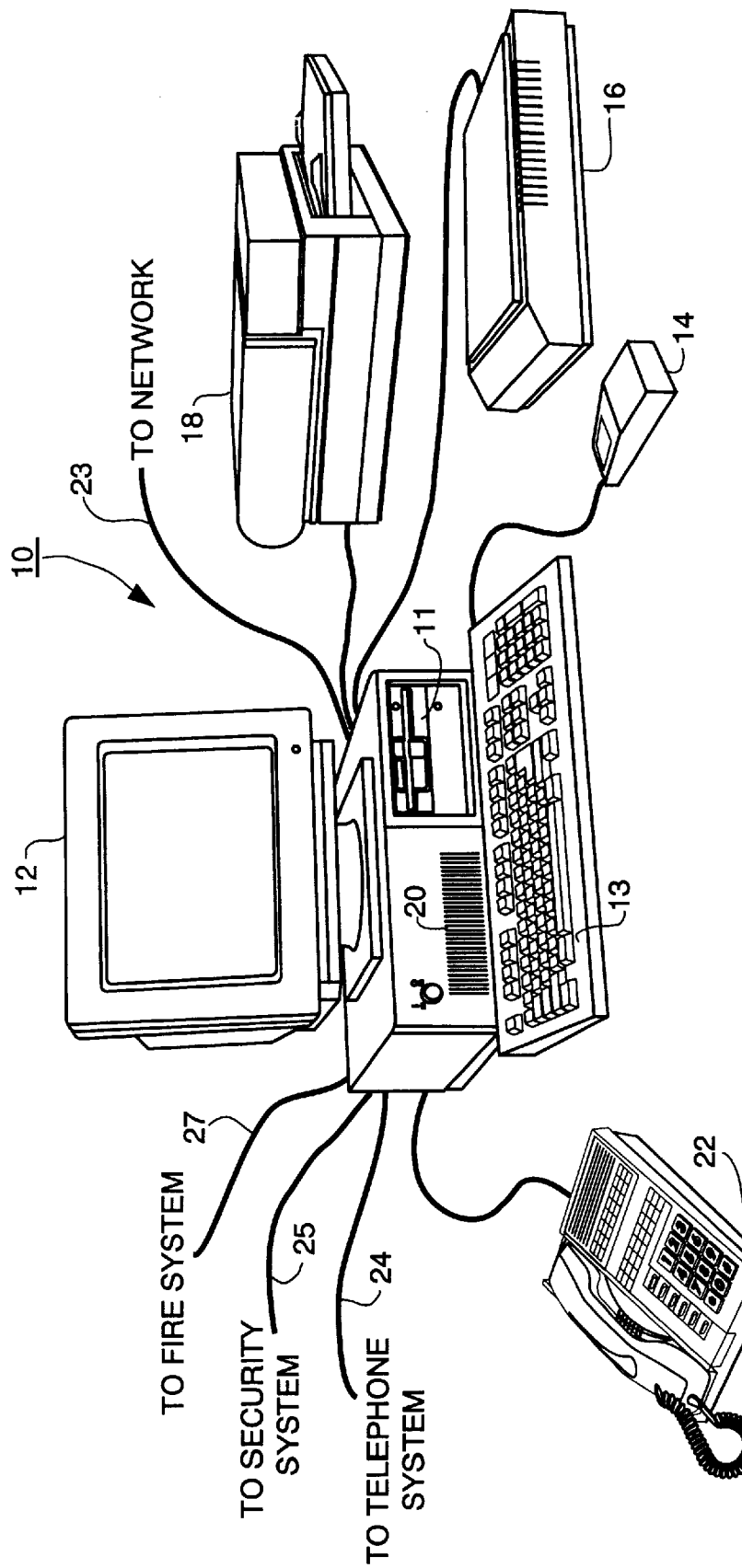
FIG. 1 is a perspective view showing the outward appearance of an apparatus according to the present invention.

FIG. 1 is a view showing the outward appearance of a representative embodiment of the invention. Shown in FIG. 1 is computing equipment 10, such as a MacIntosh, IBM PC, or PC-compatible computer. Computing equipment 10 includes a mass storage device such as disk drive 11 as well as display screen 12, such as a color monitor, keyboard 13 for entering text data and user commands, and pointing device 14, such as a mouse, for pointing to and manipulating objects displayed on screen 12.

Scanner 16 can be used to send image data to/from computing equipment 10. Data may also be input into computing equipment 10 from a variety of other sources such as a network via network connection line 23 or other sources via an unshown modem or facsimile. Printer 18 is provided for outputting documents produced by computing equipment 10.

Computing equipment 10 is connected to telephone handset 22 via an unshown telephone hardware interface (described below) and provides voice local operation over telephone lines 24.

Telephone 22 is, in addition, another source of inputting/outputting voice data to/from computing equipment 10.

Computing equipment 10 is also connected to security hardware via security cabling 25, and to fire detection/prevention hardware via cabling 27.

It should be understood that although a programmable general purpose computer arrangement is shown in FIG. 1, a dedicated or stand-alone computer or other type of data processing equipment can be used to practice the invention.

Figure 2:
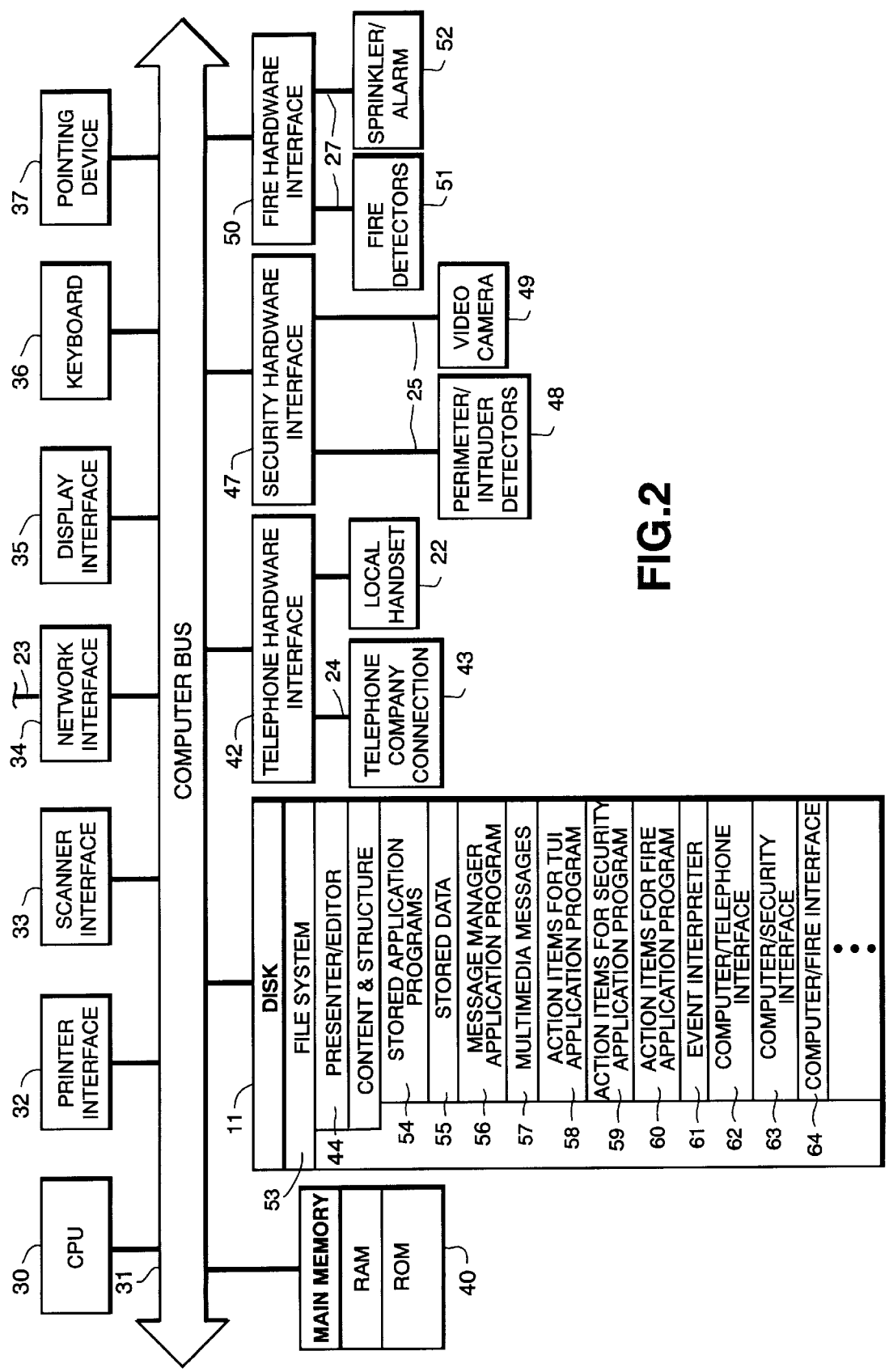
FIG. 2 is a block diagram of the FIG. 1 apparatus.

FIG. 2 is a detailed block diagram showing the internal construction of computing equipment 10. As shown in FIG. 2, computing equipment 10 includes a central processing unit (CPU) 30 interfaced with computer bus 31. Also interfaced with computer bus 31 is printer interface 32, scanner interface 33, network interface 34, display interface 35, keyboard 36, pointing device 37, main memory 40, disk 11, telephone hardware interface 42, security hardware interface 47, and fire hardware interface 50.

Main memory 40 interfaces with computer bus 31 so as to provide a random access memory storage and read-only memory storage for use by CPU 31 when executing stored program instructions. More specifically, CPU 30 loads process steps from disk 11 into main memory 40 and executes the process steps out of main memory 40.

Disk 11 has stored thereon both stored program instruction sequences which are processed by CPU 30 as well as data files stored hierarchically.

More specifically, and as shown in FIG. 2, disk 11 stores a "file system" 53 such as a MacIntosh file system, a DOS file system, a customized file system, or any comparable system, such as a database. "File system" means the portion of the computer operating system by which files are created and physically located and stored on storage media and includes, for example, conventional file systems such as a MacIntosh hierarchical file system or a Microsoft Windows DOS file system, and it also includes customized file system 53 which creates and physically locates and stores files on media, such as disk 11.

As shown in FIG. 2, file system 53 includes file system presenter/editor 44 which provides a graphical user interface to the file system stored on disk 11 and allows a user to create, edit, and manipulate the content and structure of the file system. In addition to creating, editing, and manipulating the content and structure of the file system, file system presenter/editor 44 allows an operator to run applications directly and to generate a visual representation of the file system content and structure via a graphical user interface displayed on screen 12.

The content and structure of the file system includes a variety of software structures consisting primarily of directories, stored application programs 54 which include program instruction sequences executed by CPU 30 to control operation of computing equipment 10, as well as stored data 55 which is manipulated, processed, and displayed by CPU 30 in accordance with the stored program instruction sequences.

One example of application programs stored on disk 11 is message manager application program 56 by which an operator can create, manipulate, view, send, and receive multimedia messages via modem or facsimile over telephone line 24 or over network connection 23. Multimedia messages 57 may contain a variety of objects such as text objects, bit map image objects, computer graphics objects, sound (such as voice or MIDI music) objects, and motion video objects. The message manager application utilizes functions of a telephone user interface application program (discussed below) for sending and receiving voice messages as well as facsimile and modem messages. For example, an operator creates a voice message using the message manager application and sends the voice message to an intended receiver via an outside telephone line. In order to send the message, the telephone user interface application program operates to send the voice message created by the message manager application to the designated telephone number using various process steps. Similarly, upon receiving messages, the telephone user interface application program operates to record voice messages and to place each message in a voice folder using various process steps. Once a message has been received, the message manager application operates to identify the recipient of each received voice message and stores a listing of the received messages in an "In-box" for an operator's retrieval.

Other application programs and their associated data may also be stored on disk 11, such as word processing application programs, spreadsheet programs, communication programs, and similar data processing programs.

The content and structure of the file system also includes application programs for the interactive systems which are the subject of the present invention, here shown representationally as telephone user interface ("TUI") application program 58, security application program 59, and fire application program 60. These application programs are each organized in "action items" which are described more fully below (see "Organization Of Action Items"). Generally, each interactive system responds to an event, such as detection of a telephone ringing signal or a DTMF tone, or detection of a perimeter breach, or detection of excessive smoke, or a software-created event, by selecting and processing an action item in the interactive system. The specific action item which is selected is determined by event interpreter 61 based on a match between an event name of the physical event and event identifiers for the action items. The event interpreter then causes the selected action item to be processed, which in turn may cause other applications to be activated and processed, and hardware to be controlled.

Figure 4:
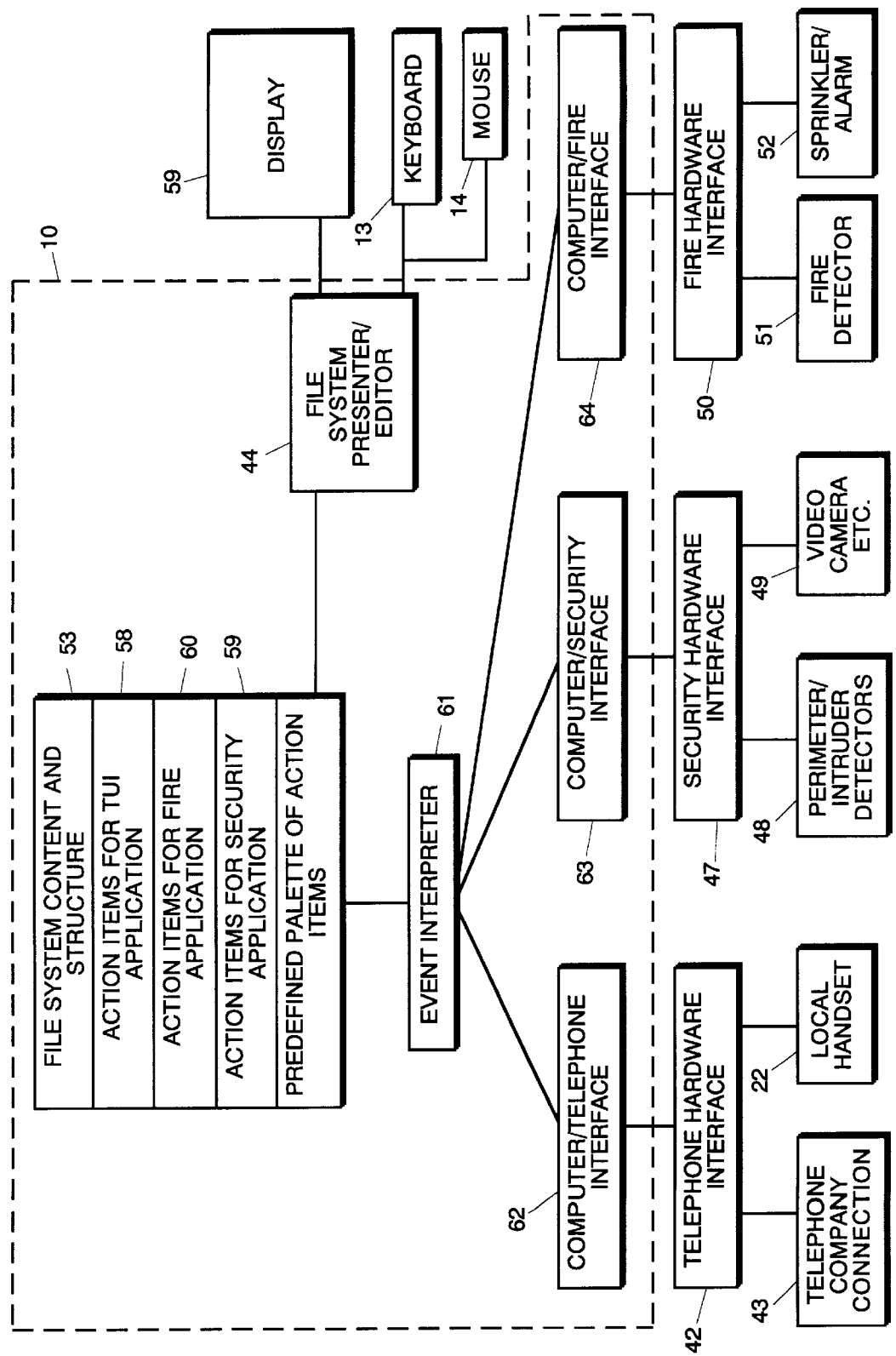
FIG. 4 is a representational view of an interactive system according to the present invention.

As shown in FIG. 4, software interface between computing equipment 10 and the telephone, fire, and security hardware (42, 47, and 50, respectively) is provided by computer/telephone interface 62, computer/security interface 63, and computer/fire interface 64, respectively. These software/hardware interface process interrupts from hardware devices 42, 47, and 50, the interrupts indicating that physical events have occurred, and translate the interrupts into a computer format usable by event interpreter 61 and/or other application programs on disk 11. Conversely, these software/hardware interfaces convert computer commands generated by the action items (and/or other application programs) into a format usable by the hardware devices 42, 47, and 50, whereby computing equipment 10 is able to effect control over the hardware devices.

In operation, a user may, for example, activate TUI application program 58. When telephone hardware interface 42 receives an incoming call via telephone company connector 43 or local telephone handset 22, an interrupt from telephone hardware interface 42 is received by computer bus 31, at which point computer/telephone interface 62 is retrieved from disk 11 and stored in main memory 40 by CPU 30 to process the hardware signal. The hardware signal, in accordance with the process steps of computer/telephone interface 62, generates an event identifier corresponding to the signal.

Event interpreter 61 utilizes the generated event name to locate an action item in file system 53 which has a corresponding event identifier. Upon locating an action item with the corresponding event identifier, event interpreter 61 processes the action item, which either generates a response to the physical event or which operates to process further action items which ultimately generate a response to the physical event. In either case, the generated response may be communicated back through computer bus 31 to computer/telephone interface 62 or communicated to other system components such as various output interfaces in the system. Computer/telephone interface 62 outputs the response to telephone hardware interface 42. Telephone hardware interface 42 generates various audible responses to the source of the incoming call, which could be telephone company connector 43 or local telephone handset 22.

(Hierarchical Organization Of Action Items)

Figure 3:
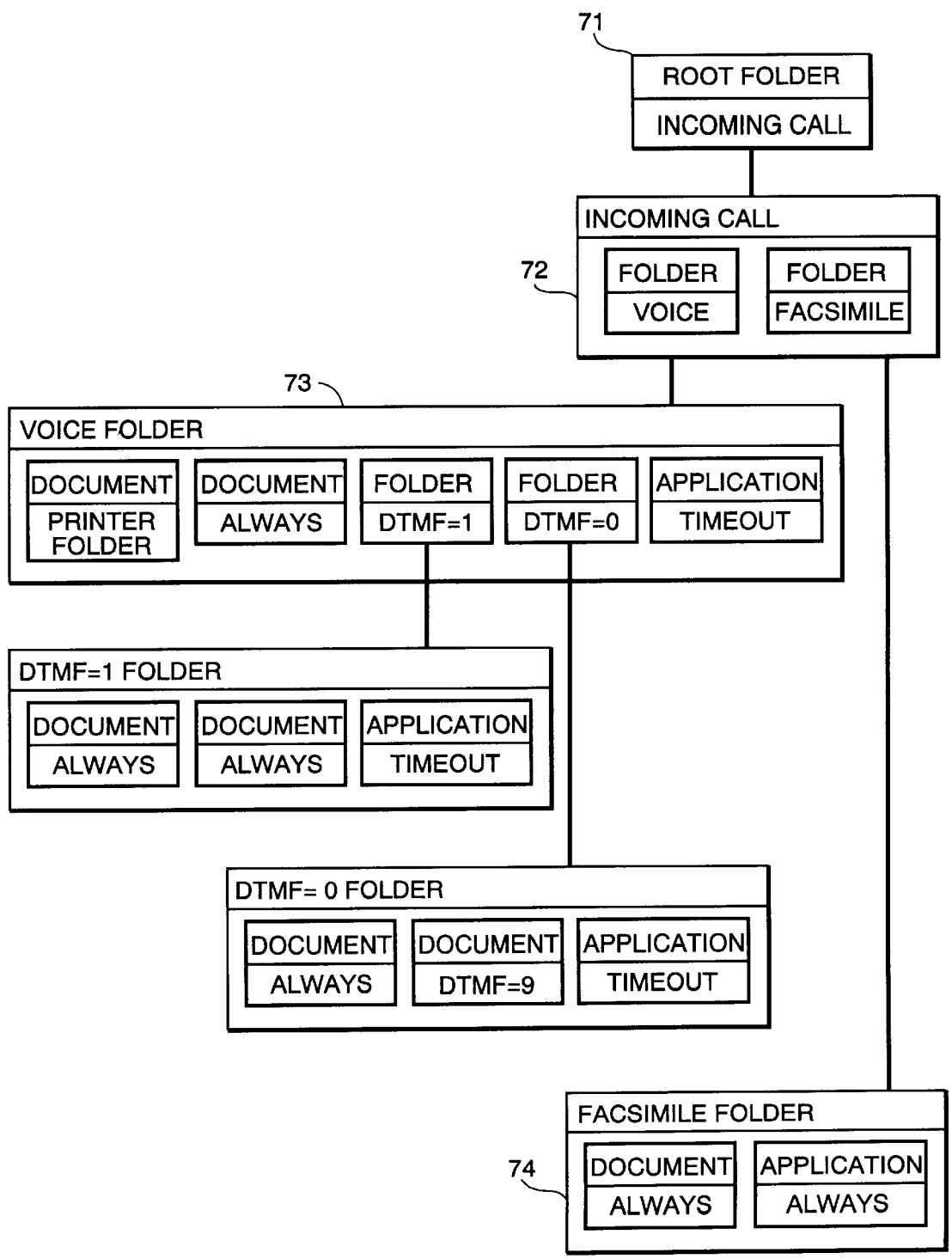
FIG. 3 illustrates the hierarchy of the content and structure of the file system of the present invention.

FIG. 3 illustrates the hierarchy of the content and structure of file system 53 which in the present case is arranged by folders, documents, applications, and links (also known as directories, data files, programs, and aliases, respectively). In the present invention, each folder, document, application, and link represents an "action item" which collectively define an interactive system.

Thus, as shown in FIG. 3, a telephone interactive service comprises a hierarchical structure which contains folders, documents, programs, and links. These items have designatable names which represent a physical event which actuates the item. As shown in FIG. 3, the interactive system is hierarchically arranged in a sequence of folders. Each folder, starting from a root folder, can contain other folders and, in addition, can also contain documents, applications, and links. Thus, root folder 71 contains incoming call folder 72. Incoming call folder 72 contains therein voice folder 73 and facsimile folder 74. Within voice folder 73 and facsimile folder 74 there are documents, folders, and applications.

As stated above, each folder, document, application, and link is an "action item". Each action item has a predefined function which in some cases performs a predefined task. In addition, each action item has an "event identifier" by which the action item may be actuated. For example, a folder action item is opened when its event identifier corresponds to a detected physical event and, likewise, any items in the opened folder are processed according to an activating event. In some instances, the entire folder will be processed, since each action item therein has been actuated by the initial actuating physical event. In the case the action item is an application, process steps in the application will be executed. On the other hand, if the action item is a document containing data such as image data, the type of data is identified and respective data processing steps are used to process the data therein. In the case of a link, the link action item will direct processing to another action item, such as a folder, a data item, etc.

As described above, an event identifier of an action item is used to actuate the action item. Thus, as shown in FIG. 3, in the case of an incoming telephone call, the event name "incoming call" matches the event identifier of the root folder and, therefore, root folder 71 is retrieved from file system 53 to be processed. Upon retrieving the "incoming call" root folder 71, root folder 71 is opened.

(Construction Of Interactive Systems)

FIG. 4 is a functional block diagram for explaining the relation and function of the various software and hardware components of an interactive system according to the present invention.

The present invention, as described above, is implemented with a telephone user interactive system, a security interactive system, and a fire detecting interactive system. It is to be understood that such are merely examples of the types of interactive systems which can be used with the present invention and that the present invention is not limited to the examples described herein. In addition, the present invention responds to physical events which may be externally occurring events, such as an incoming telephone call, and internally occurring events, such as elapsed time, and computer-generated events, such as opening a folder.

As shown in FIG. 4, telephone hardware interface 42, such as the type described in U.S. patent application Ser. No. 08/160,824, filed Dec. 3, 1993, and entitled "Two-line Telephone Controller", transmits/receives telephone signals to/from telephone company connector 43 and local handset 22. Security hardware interface 47 receives signals from perimeter/intruder detectors 48 and, in response, security hardware interface is instructed to send signals to security devices 49 such as video cameras, audible and silent alarms, and alerting law enforcement authorities. Fire hardware interface 50 receives signals from fire and smoke detectors 51 and, in response, fire hardware interface 50 is instructed to activate the sprinkler/alarm system 52.

For each hardware interface 42, 47, and 50, there is provided a corresponding computer software interface such as the aforementioned computer/telephone interface 62, computer/security interface 63, and computer/fire interface 64. Each computer software interface 62, 63, and 64 receives and converts signals to/from its respective hardware interface. In this regard, the manner by which computer software interfaces 62, 63, and 64 receive signals from respective hardware interfaces may be by an interrupt driver or may be by polling/querying each respective hardware interface after a predetermined elapsed time period.

Figure 5A:
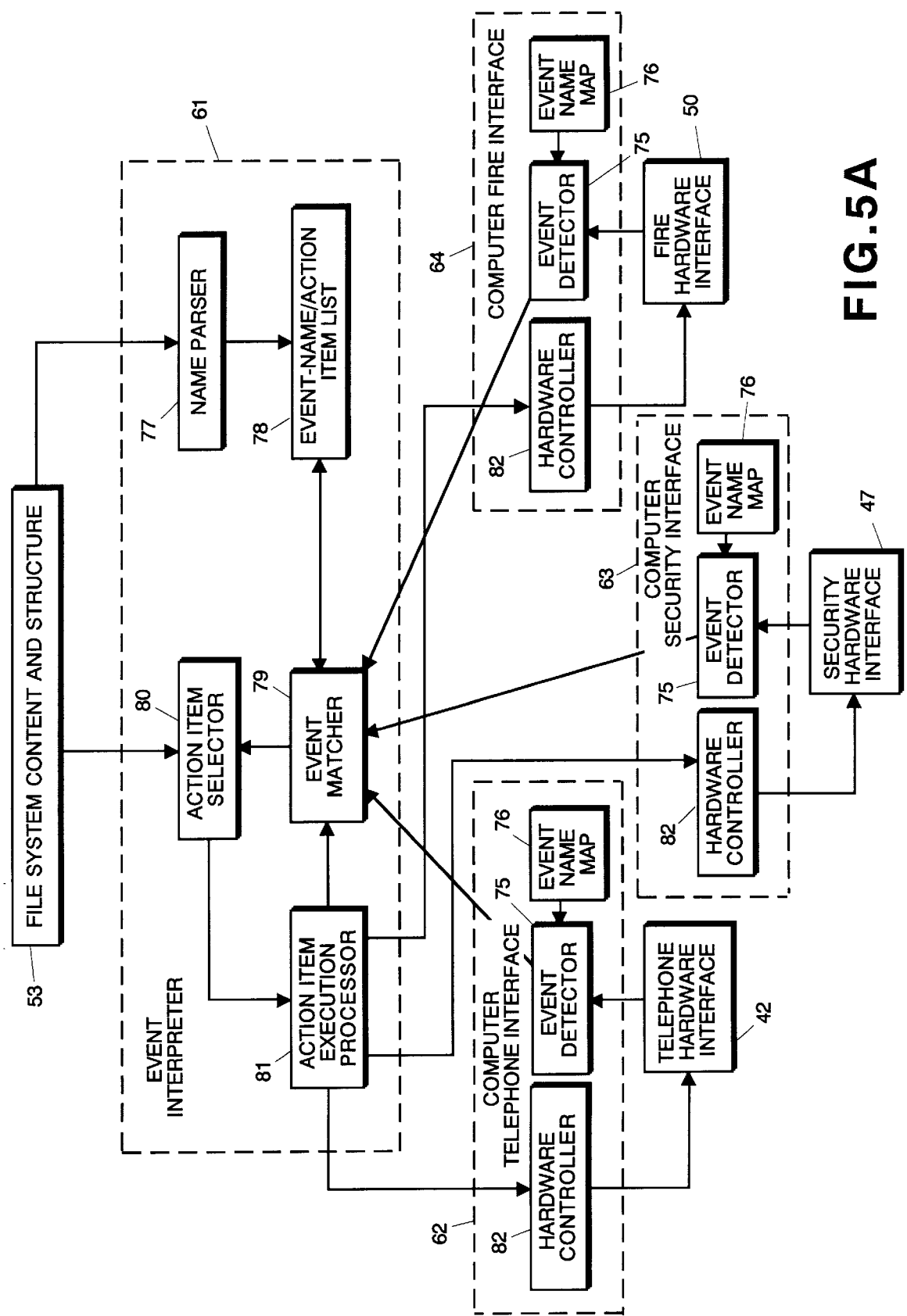
FIG. 5a is a functional block diagram detailing the operation of the preferred embodiment of the event interpreters shown in FIG. 3.

As shown in more detail in FIG. 5*a*, each computer software interface 62, 63, and 64 includes event detector 75, event name mapping 76, and hardware controller 82.

Event detector 75 receives event signals from its respective hardware interface and compares the received signal to event names in event name mapping 76. Mapping of occurrences of physical events to an event name is provided by event name mapping 76. Preferably, event name mapping 76 includes event names which bear an english language indication of the physical event, such as "ringing" when an incoming telephone call is detected by telephone hardware interface 42, "DTMF=9" when telephone hardware interface 42 detects modulated tones indicating that a touch-tone key "9" has been depressed, "zone breach" when security hardware interface 47 detects a perimeter breach, or "fire" when fire hardware interface detects smoke or heat. The generation of event names need not be generated by the computer software interface but could be generated by event interpreter 61 in much the same way.

The following table provides examples of events which are monitored in a telephone interactive service.

| Telephone Events | | |
|---|---|---|
| Event | Description | Event Name |
| INCOMING | Incoming Call | (INCOMING) |
| DTMF | Remote DTMF tones | (DTMF = n) Where n = DTMF tone(s) to trigger event. n may be a string of DTMF tones. If (DTMF = NONE) no matching event was found for received DTMF tone. |
| LOOP | Iterations waiting for DTMF tones. When a timeout occurs waiting for DTMF (ie, no DTMF tones were received from caller) a counter is incremented. When this counter is equal to the LOOP argument the action is processed. The timeout for DTMF is equal to five seconds. | (LOOP = n) Where n is the number of DTMF timeouts to occur before action is processed. |
| ENTER | Folder Access. When a folder is "entered" from above. | (ENTER) |

-continued

| Telephone Events | | |
|---|---|---|
| Event | Description | Event Name |
| ALWAYS | Any event | (ALWAYS) |
| CALLERID | Caller's phone number is matched | (CALLERID = n) Where n is the callers phone number will be unformatted numbers (ie (714) 221-1234 will be 7142211234) |
| HANDSET OFF HOOK | Local handset taken off hook | This is a built-in event that is globally available and is not represented on the desktop |
| FAX TONE SILENCE | Fax tone received DTMF timeout occurred at first level folder after any LOOP events were processed | (FACSIMILE) (SILENCE) |
| ERROR | An unrecoverable error occurred in IVR application | This is a built-in event that is globally available and is not represented on the desktop |

Upon mapping the physical event to its event name, event detector 70 outputs the name to event interpreter 61. Event interpreter 61 matches event names to event identifiers for the action items in the interactive systems. When a match is found, the event interpreter selects the matching action item and processes it. In connection with processing the action associated to the event, event interpreter 61 may transmit a response signal back through a computer software interface to hardware controller 82. Hardware controller 82 sends the signal to the designated hardware device, which performs the action. Processing of the action item may also entail data processing or computer execution of an application, such as the message manager application. These are all described in more detail below.

(Event Interpreter)

FIG. 5*a* shows details of event interpreter 61. As shown in FIG. 5*a*, event interpreter 61 includes name parser 77, event name/action item list 78, event matcher 79, action item selector 80, and action item execution processor 81.

Upon initialization, name parser 77 opens the interactive system's root folder, gathers the event identifiers of each action item therein, and places the event identifiers into event-name/action item list 78. Because event-name/action item list 78 maintains a current listing of parsed names from the selected folder, event interpreter 61 does not return to file system 53 each time in order to make a comparison. In this manner, event interpreter 61 operates more efficiently. Of course, if event-name/action item list 78 is not provided, the system will still operate but with less efficiency.

Once the system is in operation, name parser 77 operates much in the same way as during initialization, however, name parser 77 opens the currently selected folder and gathers and stores event identifiers of each action item. As soon as the event-name/action list 78 has been created, event interpreter 61 monitors and responds to signals from each computer software interface.

Event matcher 79 receives input event names generated by each computer software interface 62, 63, and 64. Event matcher 79 compares the event name to the event-name/action item list 78. In some instances, the event identifier having the corresponding event name can not be located, and in such a situation the system merely ignores the input event name and continues to monitor for events.

On the other hand, when an action item event identifier matches the event name, action item selector 80 uses the event identifier to locate and retrieve the action item stored in file system 53 for processing. After action item selector 80 retrieves the action item, action item execution-processor 81 processes the action item. The processed action item may result in further data processing which requires action item execution-processor 81 to output an event name to event matcher 79 so that another action can be retrieved from file system 53 or, when the result of processing the action item generates a controlled hardware response, action item execution-processor 81 transmits a response signal either to the computer software interface from which the event name was originally generated or to an appropriate system component, depending on the process steps in the processed action item. The controlled hardware response signal is processed by hardware controller 82 in the respective computer software interface.

Hardware controller 82 directs a hardware command to the designated hardware recipient via the hardware interface. For example, in the case of a zone being tripped in the security interactive service, event interpreter 61 processes the associated action items which generate a controlled hardware response such as activate audible alarm and activate video cameras. This hardware response signal is received by hardware controller 82 which in turn, transmits actuation signals to the alarm and video cameras via security hardware interface 47.

Figure 5B:
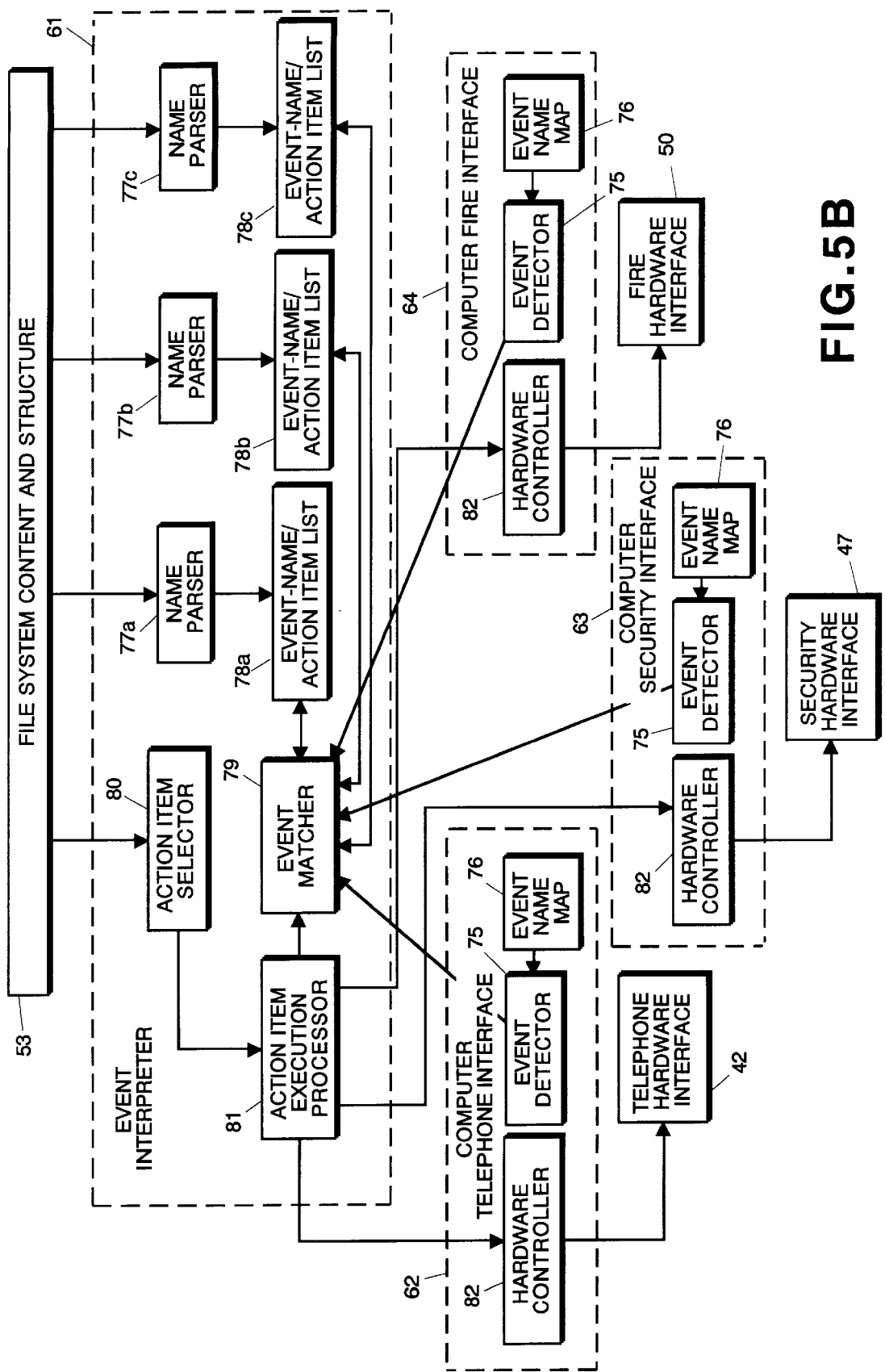
FIG. 5b is a functional block diagram detailing the operation of an alternate embodiment of the event interpreter illustrated in FIG. 3.

As shown in FIG. 5b, an alternate embodiment of event interpreter 61 includes name parsers 77a, 77b, and 77c, event-name/action item list 78a, 78b, and 78c, event matcher 79, action item selector 80, and action item execution processor 81.

In the alternate embodiment, there is provided a name parser and event-name/action item list corresponding to each interactive system in the interactive system. As a result, event identifiers in the root folder for each interactive system are parsed by its corresponding name parser which, in the present case, is telephone service name parser 77a, security name parser 77b, and fire name parser 77c. Each name parser 77a, 77b, and 77c provides parsed event identifiers for the creation of a corresponding event-name/action item list which, in the present case, is telephone event-name/action item list 78a, security event-name/action item list 78b, and fire event-name/action item list 78c.

Once each event-name/action item list is created, event matcher 79 matches received event names from computer software interfaces to each event-name/action item list 78a, 78b, and 78c, and, upon locating a matching event identifier, action item selector 80 selects an associated action item from file system 53. After retrieving the selected action item, the alternate embodiment of event interpreter 61 functions much in the same manner as the preferred embodiment of event interpreter 61.

The alternate embodiment of event interpreter 61 operates more efficiently to parse and process a current folder for each interactive system. That is, the alternate embodiment of event interpreter 61 does not have to interrupt a folder currently being processed so as to react to a physical event occurring in another interactive service. Since current folders for each interactive service have been parsed by its respective name parser, event matcher 76 can match event names to each event-name/action list for each interactive service without having to interrupt and retrieve another folder to be parsed, and without the possibility of ignoring an event name from one interactive system because only event identifiers from another system are stored in list 78.

The above-described alternate embodiment is only one example for increasing the efficiency of the interactive system. Other alternate embodiments, such as using multiple event interpreters in the interactive system, could be used as an alternative without deviating from the scope of the present invention.

Figure 6A:
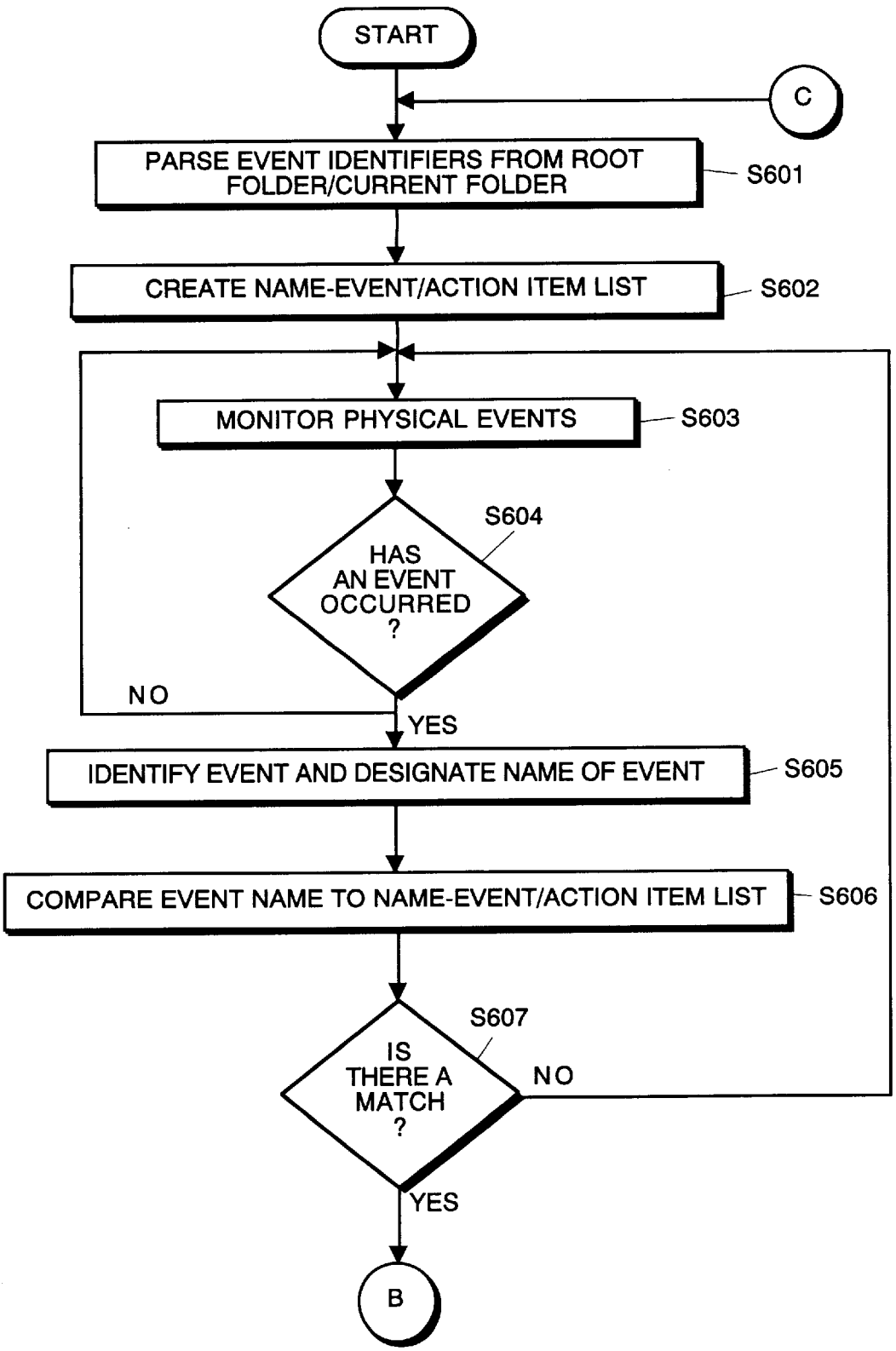
FIGS. 6a and 6b, is a flow chart describing the method for responding to a physical event using the interactive system of the present invention.
Figure 6B:
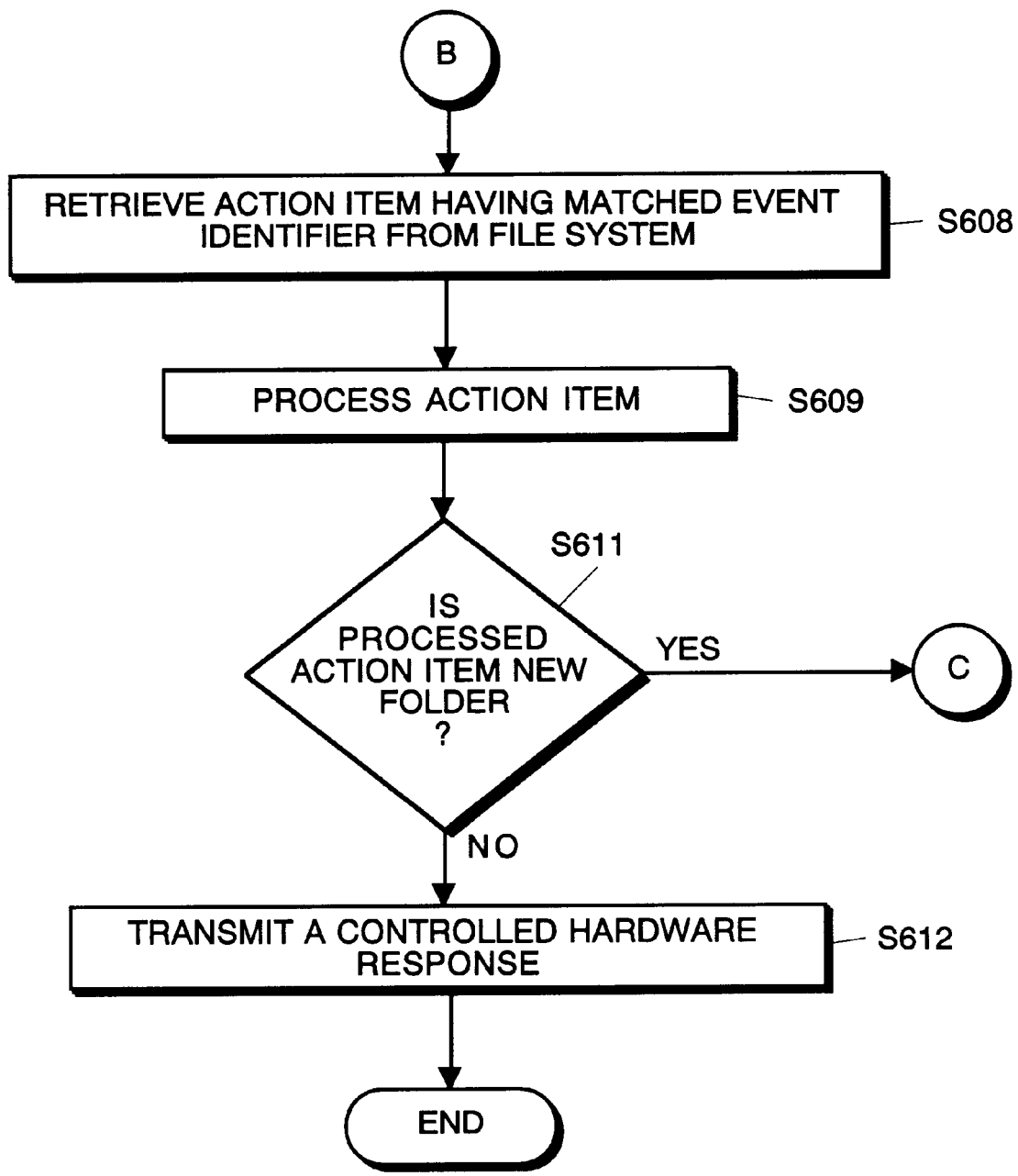

FIGS. 6a and 6b comprise a flow chart illustrating the operation of the interactive telephone user interface system described in FIG. 3.

Upon initialization, the systems root folder is automatically retrieved and parsed by name parser 77 in step S601. In step S602, the parsed names are used to create event-name/action items list 78. Once event-name/action item list 78 is created, event interpreter 61 monitors each system interface in step S603. Event interpreter 61 monitors each interface either by querying each interactive interface after a predetermined elapsed time or by being interrupted by an interrupt signal sent by the system interface in step S604. In the case that no event has occurred after each interface has been queried or if no interrupt has been received by event interpreter 61, flow returns to in step S603.

On the other hand, in a case that an event has occurred, for example, computer telephone interface 54 receives an incoming call, flow advances to step S605. In step S605, the appropriate one of computer interfaces 62, 63, or 64 identifies the physical event and designates an event name based on a comparison of the received signal to an event name map. In step S606, event matcher 79 compares the event name to event identifiers in event-name action item list 78.

In step S607, event matcher 79 determines if a match has been located between the event name and event identifiers in list 78. If no match can be made in step S607, the physical event is ignored and flow returns to step S603 where event interpreter 61 continues to monitor the interactive system. On the other hand, if event matcher 79 matches the event name to an event identifier of a folder, document, application, or link, the corresponding action item is retrieved from file system 53 by action item selector 80 (step S608).

In step S610, action item execution-processor 81 processes the contents of the action item having the corresponding physical event name. If the action item is a folder (step S611), event interpreter 61 opens the folder and flow returns to step S601 where the event identifiers for the action items in the newly opened (and now current) folder are parsed and replace the identifiers stored in list 78. In step S612, a controlled hardware response signal may be generated by action item execution-processor 81 based on the processed steps in the action item, and a signal is output to the computer software interface which in turn sends the signal to the hardware interface in order to produce a hardware response to the physical event.

Figure 6C:
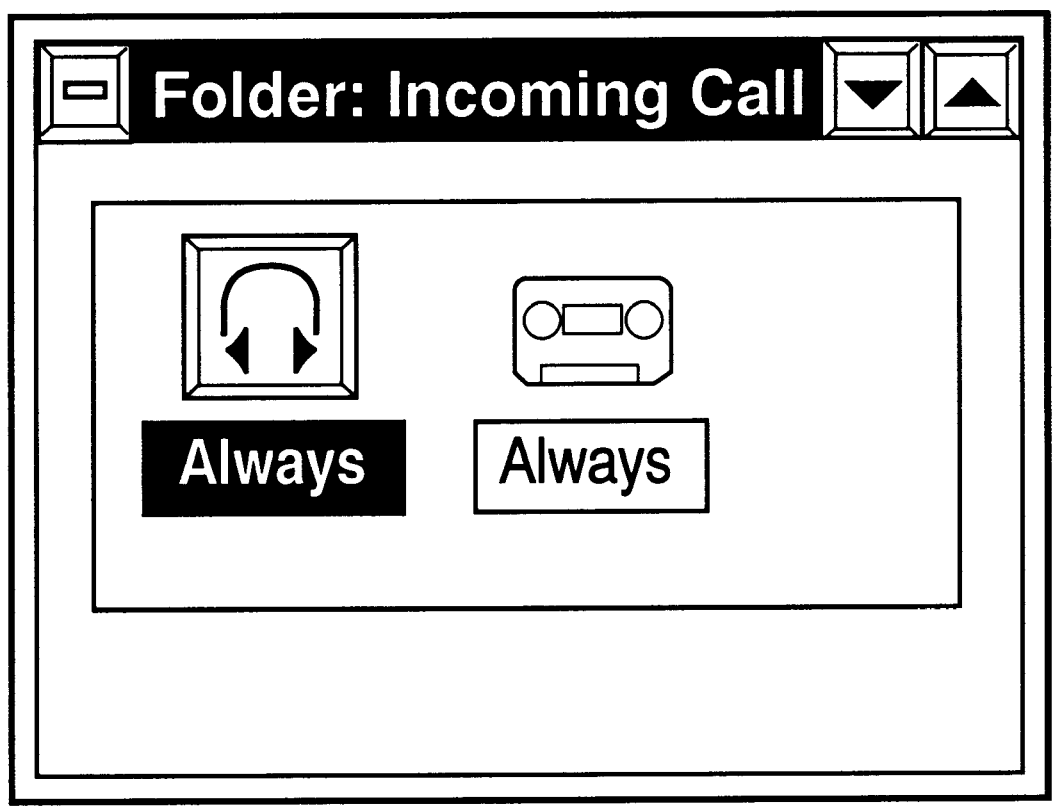
FIG. 6c is an example of the steps described in FIGS. 6a and 6b in the case of telephone user interface.

FIG. 6c is an example of the above steps in the case of a telephone user interface (TUI) interactive system. In the example illustrated in FIG. 6c, the computer telephone interface 62 identifies the event as an "incoming call" and sends an event name to event interpreter 61. Event matcher 79 compares the event name to event identifiers in list 78. Upon matching the event name, action item selector 80 locates an action item having an event identifier corresponding to "incoming call" in file system 53. Upon locating the "incoming call" action item, the action item is retrieved from the file system.

Since the "incoming call" action item is a folder, action item execution-processor 81 "opens" the "incoming call" folder. The event identifiers in that folder are then parsed and stored to replace the identifiers in list 78. Here, all identifiers are "always", which is a computer-generated event name. Thus, the "greeting" action item is named "always". Prerecorded voice data document is retrieved from file system 53, processed by action item execution-processor 81, and the result is output to the caller via computer/telephone interface 62. After playing the greeting, event interpreter 61 will execute the next action item with the same event identifier in left-to-right order. If appropriate, the action item will be processed, or the event interpreter 61 will continue to monitor for incoming events.

In the present case, the next action item is an "always" item and, therefore, it begins to record a caller's message input through telephone hardware interface 42.

(Visual Representation Of The Content And Structure Of The File System)

Reverting to FIG. 4, file system presenter/editor 44 is a component of the computer's operating system which provides a graphical user interface of file system 53. File system presenter/editor 44 allows a user to open, view, edit, create, and delete the structure and content of file system 53, including any of the action items in the interactive systems. File system presenter/editor 44 represents through a graphical user interface the content and structure of file system 53 and allows the user to manipulate the names and attributes of a folder, document, application, and link which correspond to action items in file system 53.

The graphical user interface is a representation of the content and structure of file system 53. Various representations can be used for graphical user interface such as MacIntosh's Finder which uses a folder/document/application hierarchical representation, or Windows' File-Manager which uses a directory/file/program hierarchical arrangement or any custom graphical user interface which gives a depiction of the content and structure of the file system.

In the present invention, the graphical user interface defined by file system presenter/editor 44, graphically represents the content of a folder as a window with icons within the window. These icons represent action items which correspond to folders, documents, applications, and links in file system 53. File system presenter/editor 44 also presents visible text (the aforementioned event identifier) with each displayed icon in the graphical user interface.

The graphical user interface provides the user with a hierarchical view of file system 53 so that the user intuitively understands its structure. In addition, the graphical user interface displays user-designatable menu options which will affect currently highlighted icons. For example, one menu option will permit viewing and editing of attributes of the currently selected action item or renaming of an action item. "Clicking" on a folder icon with mouse 14 will open a window that shows the contents of the folder. "Double clicking" on a document icon will execute the action item's associated process steps (editor) to process data within the document. For example, double clicking on a voice document will execute process steps for storing, editing, and manipulating voice data and double clicking on an image document will execute process steps for storing, editing, and manipulating image data in that document.

File system presenter/editor 44 interprets user selections, via keyboard 13 or mouse 14, and permits opening, viewing, and editing of files. File system presenter/editor 44 also obtains information about the content and structure from file system 53 and utilizes a windowing environment interface to represent, hierarchically, the content and structure of file system 53 visually to a user. In this manner, a user can intuitively manipulate and create action items within file system 53. While windowing environments are believed well-suited for hierarchically representing the content and structure, other environments are also usable, for example, a tree-like representation.

A discussion of the method of creating and visually displaying an interactive system will be discussed in detail below with respect to FIG. 7.

Figure 7:
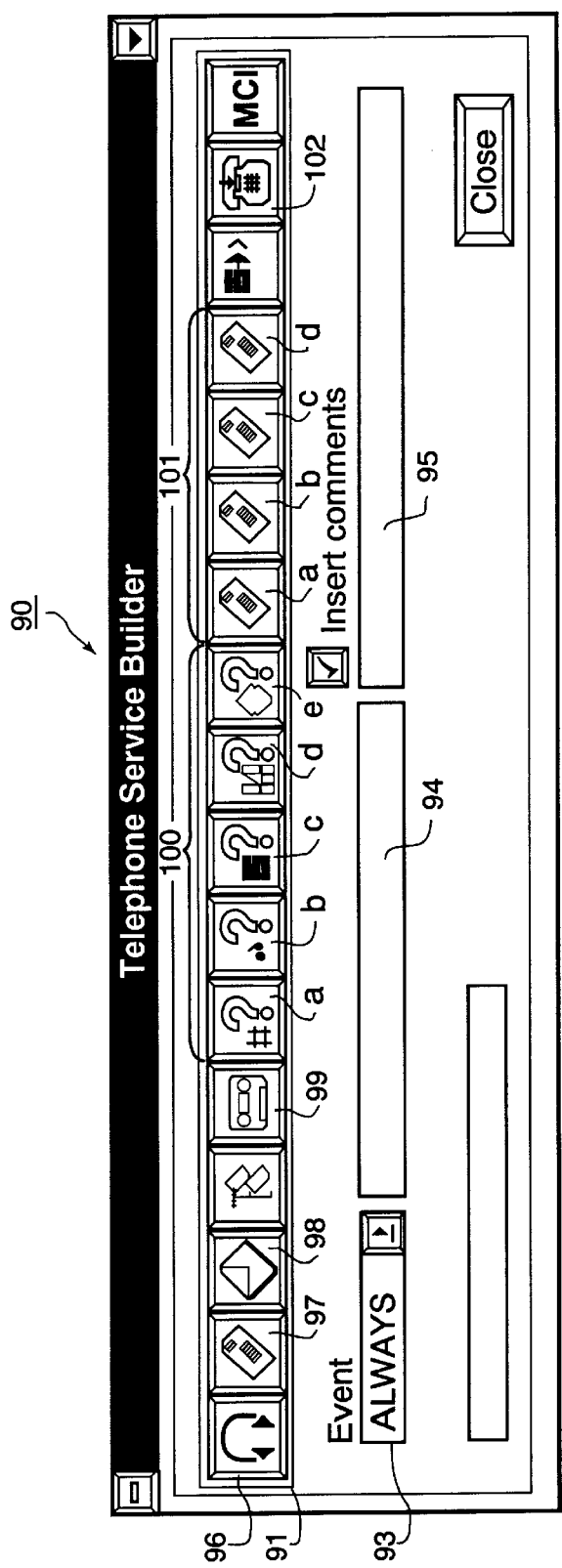
FIG. 7 is an example of an action item tool palette for building a telephone user interface.

FIG. 7 shows tool palette 90 which aids the user in building an interactive system. Tool palette 90 includes functions to create, name, and edit action items in a currently selected folder. In the example shown in FIG. 7, tool palette 90 contains action items to build a telephone user interface (TUI). Within tool palette 90, there is tool bar 91 of predefined action items which are useful in building the interactive system. Tool bar 91 contains icons representative of the various types of action items. Each action item performs a predetermined task useful in building a TUI such as playing a recorded voice message through a telephone line, recording a voice message, or sending a document by facsimile.

Event window 93 within tool palette 90 contains a listing of predefined event identifiers useful in building the interactive system. Tool palette 90 includes functions to create, name, and edit action items in a currently selected folder. Preferably, the event window contains the names of all the events in mapping 76. Once a user has selected an action item from tool bar 91, the event window 93 permits the user to name the selected action item with a respective physical event identifier.

Value window 94 is used to input additional parameters which are used to form or to complete the event specification which actuates the action item. Comment window 95 allows the user to add additional descriptive text which may include a further description of the action item. In this regard, the added text is ignored by event interpreter 61 when selecting and executing the action item or folder.

As described above, folders, documents, applications, and links are standard items provided by file system 53 and graphically represented by file system presenter/editor 44. The action items within a folder provide an executable action in response to a physical event. Each folder, document, application, and link has an event identifier and an attribute set by the user. The event identifier and attributes can be changed by the user via the graphical user interface (tool palette 90) and the presenter/editor. Attribute values determine whether the action item is an input response or an output response. The attributes can be stored with each action item or stored separately from the action item. For example, in the case of the telephone user interface system, if a data document of ASCII text has a "speak" attribute, it may be played, via telephone hardware interface 42, using text-to-speech methods.

To create an interactive system, the user selects from tool bar 91 any of the action items by clicking on the graphical representation or icon with mouse 14. In a TUI, for example, the system designer would create an interactive system by selecting various icons from tool bar 91 so as to answer an incoming call, play a greeting, play a recorded menu of possible selections, request input of a selection using DTMF tones, output selected information, terminate the call, etc.

The table below includes descriptions of some of the action items contained in tool bar 91 illustrated in FIG. 7.

EXAMPLES OF ACTION ITEMS IN FIG. 7

| NAME OF ACTION | DESCRIPTION | ATTRIBUTE |
| --- | --- | --- |
| Folder (98) | Make the folder the current folder | None |
| Play Voice (96) | Play a voice document. | Send |
| Record Voice (99) | Record voice off phone line to a voice object. | Receive |
| Send Message (97) | Send a message. | Send |
| End The Call (102) | End the call by hanging up. | Send |
| Say Number Of Messages (100a) | Use concatenated speech to tell the caller the number of messages in a folder. | Send |
| Say Message Info (100b) | Use concatenated speech to tell the caller the date, time, and method of delivery of the currently selected message in a folder. | Send |
| Say Last DTMF (100c) | Use concatenated speech to speak the stored DTMF digits to the caller. | Send |
| Say Current Date And Time (100d) | Tell caller the current date and time using concatenated speech. | Send |
| Say Elapsed Time (100e) | Tell the caller the elapsed time he has been on the line using concatenated speech. | Send |
| Skip To Next Message (101b) | Make the current message the next one in a specified folder. | None |
| Play Message (101a) | Play a voice message to the caller. | Send |
| Forward Message (101c) | Forward message to a specified folder. | |
| Delete Message (101d) | Delete current message. | |

Figure 7A:
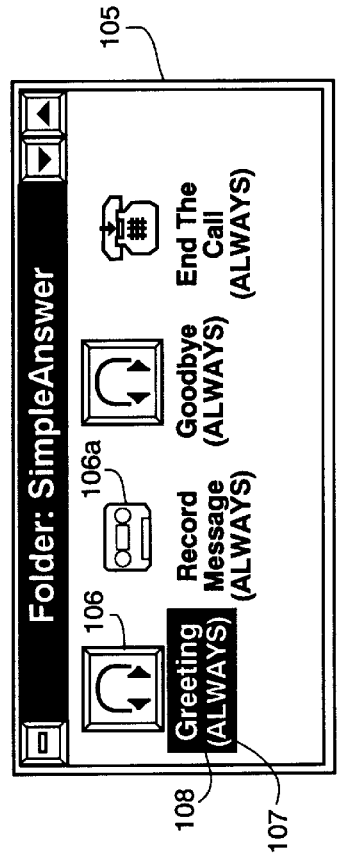
FIG. 7a is an interactive service built by the tool palette in FIG. 7.
Figure 8:
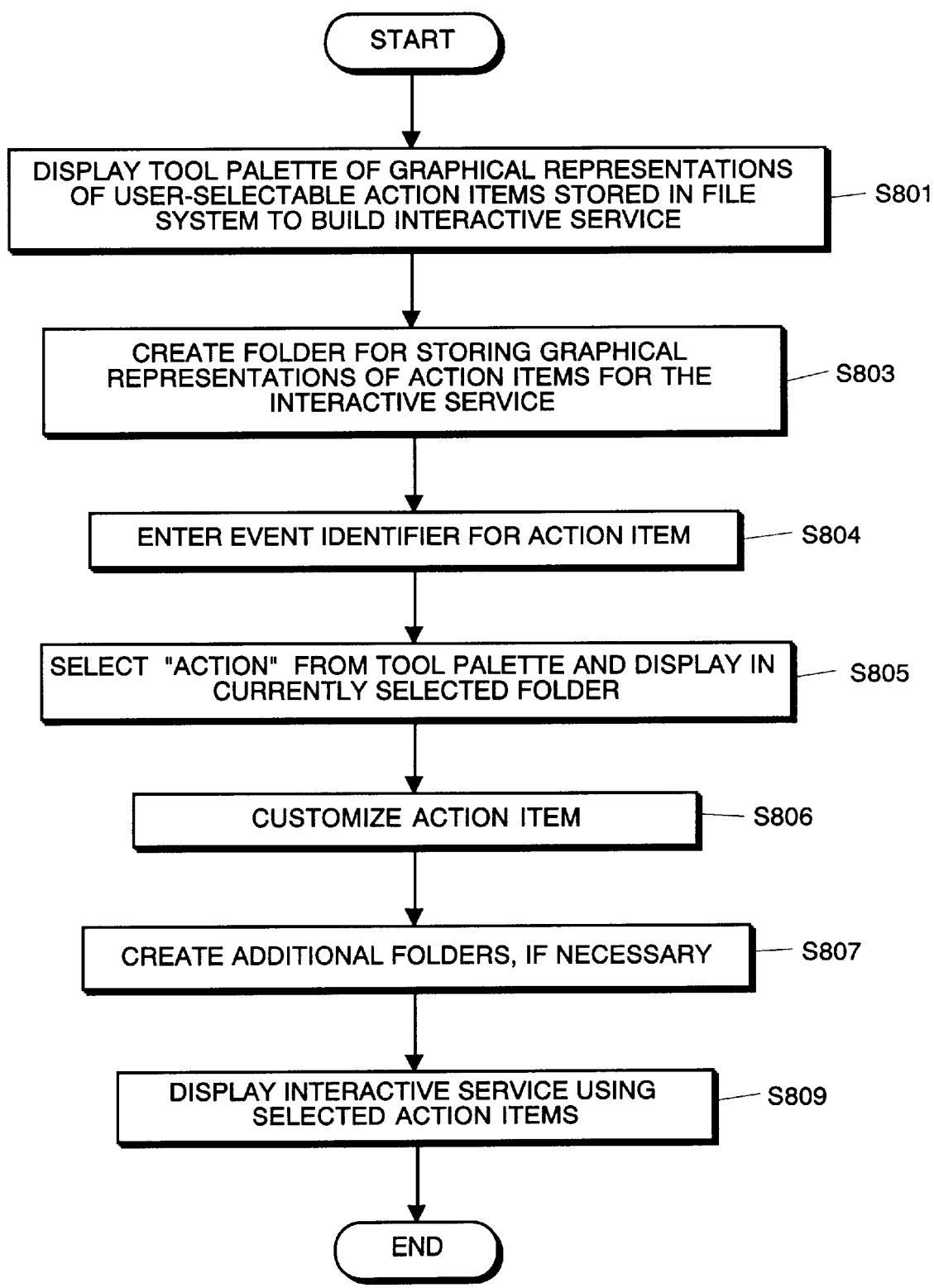
FIG. 8 is a flow chart describing the method for creating an interactive system using the tool palette shown in FIG. 7.

FIG. 7a illustrates a basic interactive telephone user interface (TUI) system for answering an incoming telephone call, recording a caller's message, playing a recorded farewell, and terminating the phone call, and FIG. 8 is a flow diagram for explaining how a user uses tool palette 90 to create this TUI.

Upon entering a request to create a telephone user interface, file system presenter/editor 44 retrieves a telephone service builder tool palette, such as tool palette 90. In step S801, file system presenter/editor 44 displays tool palette 90, via the graphical user interface, which includes graphical representations of user-selectable action items. In step S803, the user creates a folder to be used to store various action items selected by the user.

To create an interactive service as shown in FIG. 7a, a user selects a name for the action item to be selected using event window 93 (step S804) and selects an action item from tool bar 91 by clicking on the desired action item. Upon clicking on the desired action item, the selected action item appears in the folder (step S805) with its event identifier which actuates the action item (as shown in brackets at reference number 107). As shown in FIG. 7a, action item 96 has been selected and has been created in folder 105 as shown at 106 with its event identifier. In step S806, the user customizes the action item by entering commentary via comment window 95 (as shown at reference number 108). In the present example, action item 106 has been assigned an event identifier of "always", meaning that the action will be executed every time folder 105 has been entered and has been defined by the comments as a "greeting". In addition, the event identifier shown at reference number 107 can be changed by entering a new name in event window 93 while the action item is currently selected.

The user builds the entire interactive system program by naming, selecting, and entering commentary (if necessary), for each action item in the interactive service. An action item can be customized further by double clicking on the action item icon to execute the associated editor to further define the behavior of the action item application or to create, edit, or manipulate data in an action item document.

For example, to record the greeting message associated with action item icon 106, the user double clicks the icon so as to open the action item. The file system presenter/editor 44 then permits the user to record a voice greeting message, e.g., using handset 22. Presenter/editor 44 automatically allows voice recording when icon 106 is double-clicked because of the attributes that are stored with predefined action item 96 in tool bar 91. The other predefined action items in tool bar 91 have appropriate attributes stored with them which allow, for example, entry of text for a text item, designation of file space for a voice recording action item, etc.

The user continues to build the interactive TUI by selecting action item icons. Thus, as shown in FIG. 7a, the user has selected a message recorder icon 99 at 106a, and has assigned an appropriate event identifier, all as described above (see steps S804, S806, and S807).

Step S803 through step S807 are repeated until the interactive service is complete. File system presenter/editor 44 displays the service as it is being created or manipulated by using retrieved visual representations of action items in step S809.

Once a user has initially created a portion of an interactive system, the user may use existing folders, documents, and application items by copying and altering the content and structure of the item. It is also possible to create various interactive services by (1) further customizing an existing interactive service, (2) building an interactive service from predefined, linked action items (i.e., folders having an arrangement of action items therein to perform predetermined tasks), (3) building an interactive service from newly created action items, or (4) building an interactive service from predefined, individual action items as described above. Because the interactive system can be intuitively designed using graphical representations of the hierarchy and content of the system, a user can design an interactive system program with precision and with ease.

As shown in FIG. 7a, file system presenter/editor 64 presents the content of folder "simple answer" as "action item" icons having visible text names which relate to physical events which actuate the item in the interactive system.

The method of visually representing interactive service application using the present invention will be described in greater detail by way of the examples illustrated in FIGS. 9–12.

Figure 9:
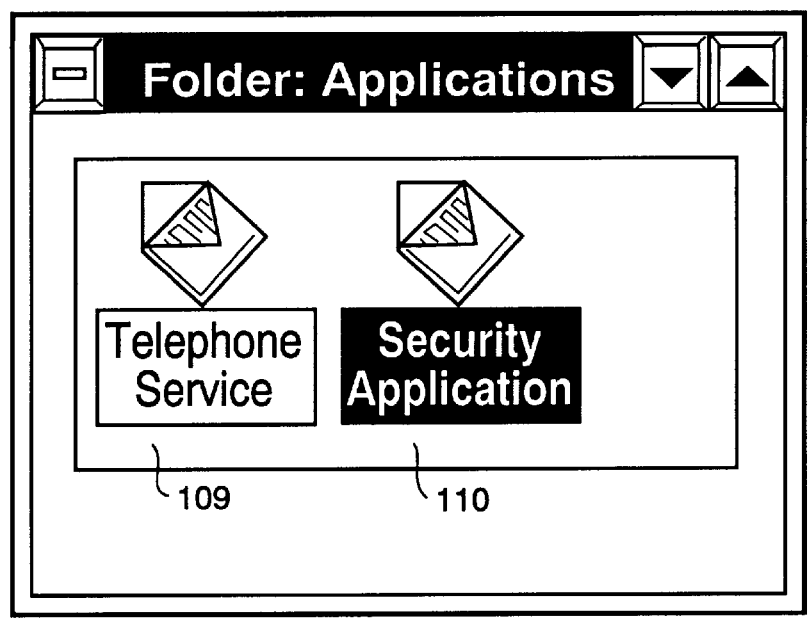
FIG. 9 is an example of a window-type display showing a telephone user interactive system and a security interactive system.

The interactive system illustrated in FIG. 4 includes a telephone interactive service, a security interactive service, and a fire detector interactive service. As shown in FIG. 9, file system 53 includes a telephone interactive service root folder 109 and a security interactive service root folder 110 (the fire detector interactive service folder is included in the security interactive service root folder 110) which include action items to respond to events in each respective interactive service.

As described above, during operation of, say, the telephone user interactive system, when an "incoming call" event occurs, computer telephone interface 62 sends an event name to event interpreter 61. Event interpreter 61 locates action item folder "telephone service" 109 in file system 53. Upon locating action item folder "telephone" 109 shown in FIG. 9, action item folder 113 is entered for further processing.

Figure 10:
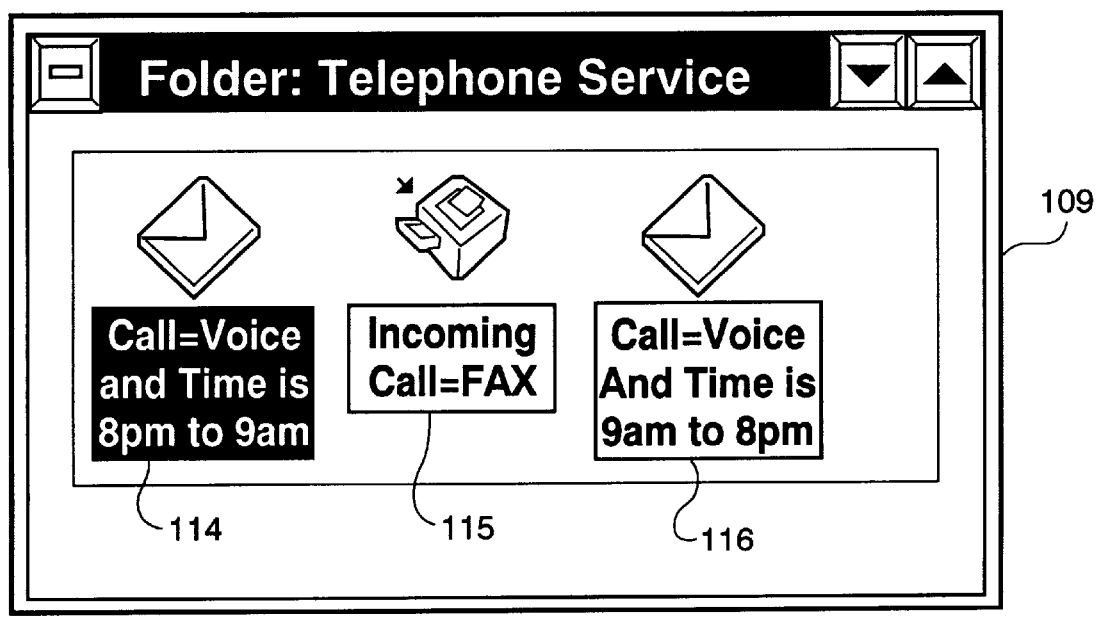
FIG. 10 is a window-type view of a folder in the telephone user interactive system.

Visual representation of this interaction is shown in FIG. 10. As seen there, "telephone service" folder 109 is displayed by file system presenter/editor 44 as a window folder having three action items stored therein which are indicated by reference numerals 114, 115, and 116. The compound event identifier of action item 114 indicates that action item folder 114 is opened only if both conditions are true. In this case, the physical events which open action item 114 are a voice transmission and the time of day being between 8 p.m. and 9 a.m. Action item folder 115 is a facsimile folder which is processed if the incoming call is a facsimile transmission and action item 116 responds to a compound event which corresponds to a voice transmission and a time of day being between 9 a.m. and 8 p.m.

Figure 11A:
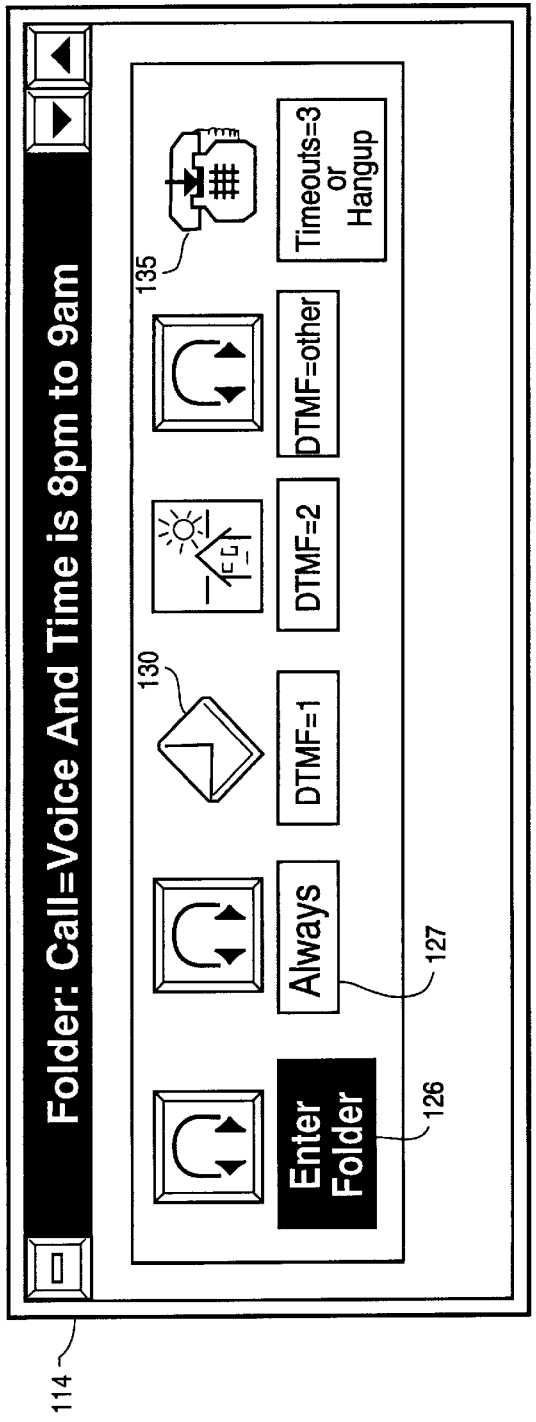
FIGS. 11a and 11b, is a visual representation of a telephone user interactive system.
Figure 11B:
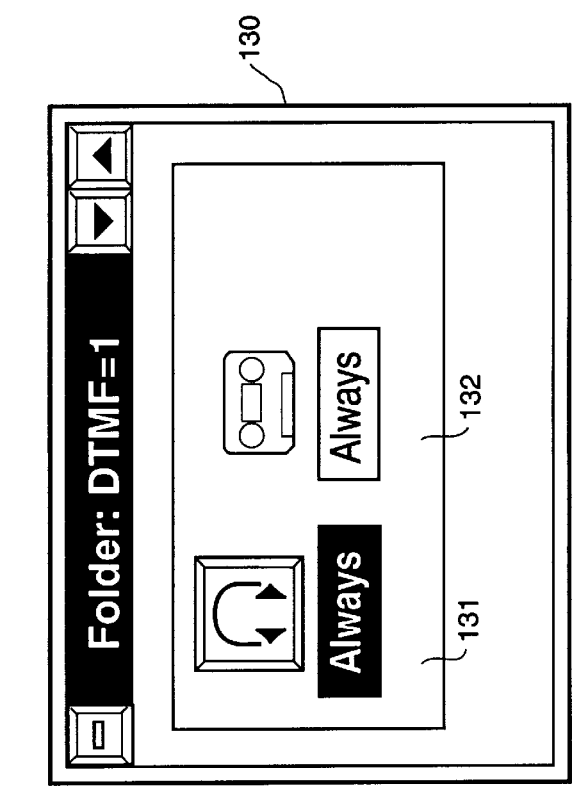

The contents of folder 114 are visually displayed by file system presenter/editor 44 as illustrated in FIG. 11a. Folder 114 is depicted as containing various types of action items. For example, action item 126 represents an application which plays a pre-recorded greeting upon entering folder 114, and action item 127 represents an application which plays a pre-recorded menu of selections by which a caller can select various functions of the service by depressing touch-tone keys on the caller's telephone. For example, "DTMF=1" represents an action item folder 130 which is activated upon depression of a touch-tone button "1". In addition to the above-described action items, call termination action item 135 is provided to terminate a telephone call upon an elapsed time of three seconds or upon a caller's hang-up.

Figure 12A:
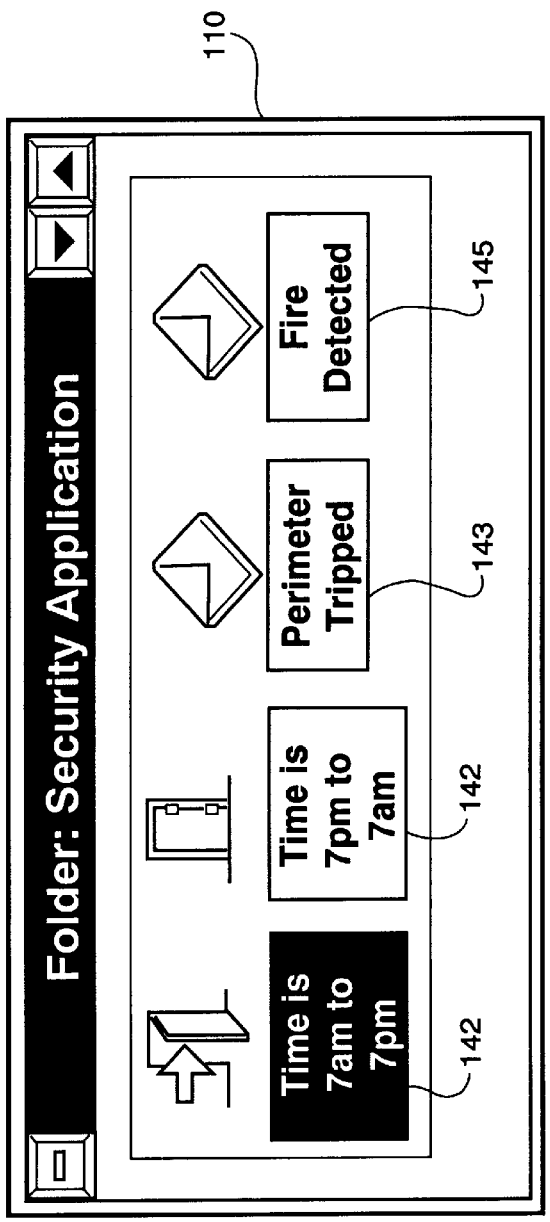
FIGS. 12a and 12b, is a visual representation of a security interactive system.

As shown in FIG. 12a, file system presenter/editor 44 visually represents security interactive service root folder 110 as having various action items and folders. In folder 110, action items 141 and 142 represent application action items which are processed in response to an internally monitored event such as the present time of day being between 7 a.m. and 7 p.m. For example, action item 141 may be used to disarm the security system and action item 142 may be used to arm the security system if the time of day is between 7 p.m. and 7 a.m. On the other hand, folders 144 and 145 represent folder action items which respond to externally monitored physical events monitored by security interface 47.

Figure 12B:
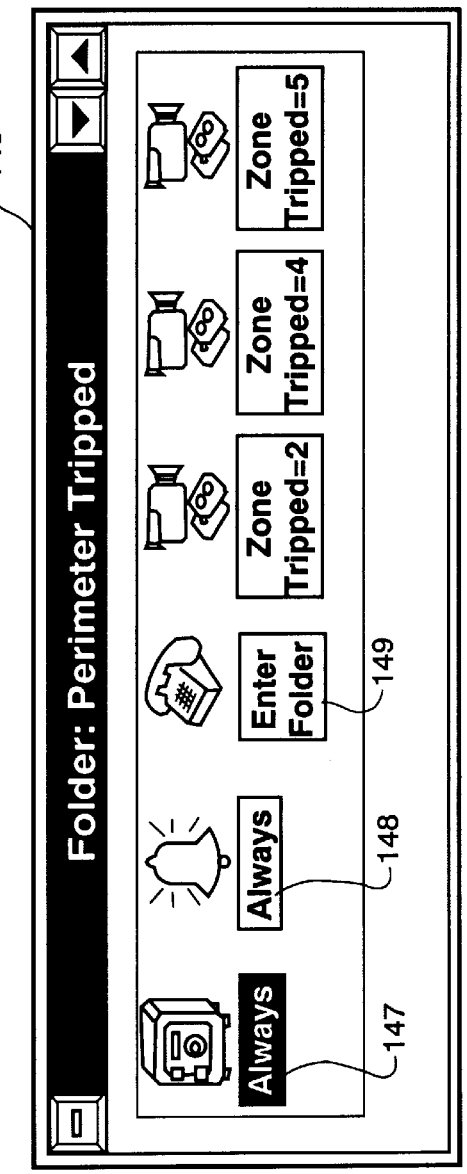

As shown in FIG. 12b, action item folder 143 is visually represented as having action items which respond to events occurring in a secured perimeter area. As shown in FIG. 12b, file system presenter/editor 44 visually represents "perimeter tripped" folder 143. For example, "always" action item 147 represents an action which automatically locks the safe, "always" action item 148 represents an action which actuates the audible alarm, and "always" action item 149 represents an action which automatically alerts the police.

The above descriptions of the telephone user interactive system and the security interactive systems are merely examples of some of the visual representations of interactive services which can be generated and viewed hierarchically by file system presenter/editor 44. It is to be understood that any internally monitored event and any externally monitored event can be substituted for the ones described herein. For example, an interactive system could be designed to monitor physical events in a robotic assembly line manufacturing plant, a medical system, or any other type of event-responsive interactive system.

What is claimed is:

1. An event interpreter executable on a computer having a file system for arranging files in a hierarchical structure of folders, said event interpreter for selecting action items for execution based on occurrence of events in an interactive system, comprising:

a file system for storing an interactive system application, said interactive system application comprising event identifiers and action items, at least one action item being associated with each event identifier, each of said action items being end user-definable through a graphical user interface and capable of providing, upon being processed, a software or a hardware response or both a hardware and a software response to a detected event, and each of said event identifiers having a text-based description displayable by the file system and corresponding to a name of a file or a folder, in the file system, that is associated with at least one action item, for providing a user with a description of an event to which an associated action item is intended to provide a response;

an event parser for traversing the file system for files or folders associated with the interactive system application, for gathering event identifiers in the interactive system application from the file system, and for parsing the event identifiers into a list of event identifiers and associated action items;

means for sending to the event interpreter a computer-usable signal indicating that an event has occurred;

an event name generator for receiving the computer-usable signal and for generating an event name based on the computer-usable signal; and an action item selector for comparing the event name to event identifiers in the list of event identifiers and associated action items, and, in the case the event name matches an event identifier in the list of event identifiers and associated action items, for selecting from the file system the file or folder identified by the matched event identifier associated with an action item and processing the selected action item.

2. An event interpreter according to claim 1, wherein the means for sending comprises an input section which includes at least one hardware event interface for monitoring signals from a plurality of hardware event detectors.

3. An event interpreter according to claim 2, wherein the at least one hardware event interface monitors a telephone system.

4. An event interpreter according to claim 2, wherein the at least one hardware event interface monitors a security and fire detection system.

5. An event interpreter according to claim 1, wherein the event name generator converts the signal from the sending means by mapping the signal to event names in an event-name map.

6. An event interpreter according to claim 1, wherein the computer-usable signal is generated by a computer software interface which receives an input signal from a hardware event interface.

7. An event interpreter according to claim 1, further comprising an action item processor for processing the selected action item and, in accordance with the result of processing, for producing a controlled hardware response signal to the occurrence of the physical event.

8. An event interpreter according to claim 1, further comprising a display screen for displaying a graphical user interface which graphically displays the action item, and wherein the graphical user interface is used to manipulate and edit the displayed action item.

9. An event interpreter according to claim 1, wherein said action item selector ignores the event in the case no match can be found in the list for the event name.

10. An event interpreter according to claim 1, further comprising a display screen for displaying the graphical user interface which graphically displays the action item, and wherein the graphical user interface is used to manipulate and edit a file or folder associated with the displayed action item thereby modifying functionality of the interactive system.

11. An interactive system executable on a computer having a file system for arranging files in a hierarchical structure of folders, said interactive system for monitoring and for responding to events, comprising:

a plurality of action items stored in the file system, each action item being end user-definable through a graphical user interface and corresponding to an event identifier which provides a user with a text-based description of at least one event monitored in the interactive system to which at least one corresponding action item is intended to provide a response, the text-based description being displayable to the user by the file system and corresponding to a name of a file or a folder, in the file system, that is associated with at least one action item;

an event parser for traversing the file system for folders or files associated with the interactive system and gathering the event identifiers, and for parsing the event identifiers into a list of event identifiers and corresponding action items;

an event interface for detecting an occurrence of at least one event and for outputting a signal in response to the occurrence of an event;

a name generator for receiving the signal from the event interface and for generating an event name based on the received signal; and an event interpreter for matching the event name to an event identifier in the list of event identifiers and corresponding action items and for selecting from the file system the file or folder associated with an action item and for processing the action item from the file system, the action item corresponding to an event identifier matching the generated event name, wherein the action item, upon being processed, provides either a software or a hardware response or both a hardware and a software response to the detected event.

12. An interactive system according to claim 11, further comprising a physical event detector for detecting a physical event and outputting an event detection signal to the event interface upon the occurrence of the physical event.

13. An interactive system according to claim 12, wherein the name generator generates an event name by mapping the received signal into an event-name map of event names.

14. An interactive system according to claim 12, wherein the physical event detector detects physical events in a telephone system, and wherein, as a result of the occurrence of the physical event, the event interpreter causes a physical response to be produced based on the processed action item.

15. An interactive system according to claim 12, wherein the physical event detector detects physical events in a security system, and wherein, as a result of the occurrence of the physical event, the event interpreter causes a physical response to be produced based on the processed action item.

16. An interactive system according to claim 11, further comprising an action item builder for creating and editing action items to be stored in the file system, wherein the action item builder provides event identifiers for each action item by which the action item is actuated.

17. An interactive system according to claim 11, wherein the action items to be processed include at least one of voice data, text data, and image data.

18. An interactive system according to claim 11, wherein action items are comprised by a folder, a document, or an application.

19. An interactive system according to claim 11, further comprising a display for displaying the graphical user interface for modifying the interactive system by manipulating a file or folder associated with the at least one event-actuatable action item in the graphical user interface.

20. A method executable on a computer having a file system for arranging files in a hierarchical structure of folders, said method for selectively processing action items for execution based on occurrence of events in an interactive system, comprising the steps of:

storing an interactive system application, said interactive system application comprising event identifiers and action items, at least one action item being associated with each event identifier, each of said action items being end user-definable through a graphical user interface and capable of providing, upon being processed, a software or a hardware response or both a hardware and a software response to a detected event, and each of said event identifiers displayable by the file system and corresponding to a name of a file or a folder, in the file system, that is associated with at least one action item, the event identifiers providing a text-based description of an event to which an associated action item is intended to provide a response;

traversing the file system for files or folders associated with the interactive system application via an event parser;

gathering event identifiers in the interactive system application from the file system via the event parser;

parsing, via the event parser, the event identifiers into a list of event identifiers and associated action items;

sending a computer-usable signal indicating that an event has occurred to the event interpreter;

receiving the computer-usable signal at an event name generator which generates an event name based on the computer-usable signal; and comparing, in an action item selector, the event name to event identifiers in the list of event identifiers and associated action items, wherein, in the case the event name matches an event identifier in the list of event identifiers and associated action items, the method further comprises the step of selecting from the file system the file or folder identified by the matched event identifier associated with an action item and processing the selected action item.

21. A method according to claim 20, further comprising the step of designating the displayed icon and, in response to designation, permitting editing of the action item represented by the icon.

22. A method according to claim 20, further comprising the steps of designating the displayed icon and, in response to designation, actuating the action item represented by the icon.

23. The method according to claim 20, further comprising the steps of:
displaying, within the window corresponding to the selected folder, at least one folder action item; and
displaying, in conjunction with the folder action item, an event identifier which causes the folder to be accessed.

24. The method according to claim 20, further comprising the steps of:
displaying, within the window corresponding to the selected folder, at least one folder action item and at least one executable action item representative of an event-actuatable application; and
displaying, in conjunction with the folder action item and with the executable action item, respective event identifiers which cause the folder to be accessed and the executable action item to be processed.

25. A method according to claim 20, wherein the selected folder contains additional folder action items and action items which represent event-actuatable applications.

26. A method according to claim 20, wherein the displayed action item is a graphical representation of a physical response to the detected event.

27. A method according to claim 20, wherein the displayed identifier is representative of the name of a corresponding actuating event.

28. A method according to claim 20, wherein in the case no match can be found in the list for the event name, the method further comprises the step of ignoring the event.

29. The method according to claim 20, further comprising the step of displaying the graphical user interface which graphically displays the action item, and wherein the graphical user interface is used to manipulate and edit a file or folder associated with the displayed action item thereby modifying functionality of the interactive system.

30. A method executable on a computer having a file system for arranging files in a hierarchical structure of folders, said method for monitoring and for responding to events, comprising the steps of:
storing, in the file system, a plurality of action items, each action item being end user-definable through a graphical user interface and corresponding to an event identifier which provides a user with a text-based description of at least one event monitored in an interactive system to which at least one corresponding action item is intended to provide a response, the text-based description being displayable to the user by the file system and corresponding to a name of a file or a folder, in the file system, that is associated with at least one action item;
traversing, in an event parser, the file system for files or folders associated with the interactive system;
gathering, in the event parser, the event identifiers and parsing the event identifiers into a list of event identifiers and corresponding action items;
detecting, over an event interface, an occurrence of at least one event and outputting a signal in response to the occurrence of an event;
receiving, at a name generator, the signal from the event interface and generating an event name based on the received signal; and
matching, in an event interpreter, the event name to an event identifier in the list of event identifiers and corresponding action items; and
selecting from the file system the file or folder associated with an action item and processing the action item from the file system, the action item corresponding to an event identifier matching the generated event name, wherein the action item, upon being processed, provides either a software or a hardware response or both a hardware and a software response to the detected event.

31. A method according to claim 20, wherein the displayed window and its contents represent an interactive system.

32. A method for creating a user-definable interactive system using a tool palette of predefined action items, comprising the steps of:
storing a plurality of action items, each of the plurality of action items performing a predetermined task;
displaying a tool palette of graphical representations corresponding to each of the plurality of action items;
responding to a designation of one of the displayed graphical representations by selecting the corresponding action item; and
associating graphical representations of each of the selected action items so as to define at least part of the interactive system.

33. A method according to claim 32, further comprising the step of selecting an event identifier by which the action item is actuated.

34. A method according to claim 32, wherein the tool palette and the associated graphical representations of each of the selected action items are displayed in a windowing environment.

35. A method according to claim 32, wherein the responding step responds to a user designation of a graphical representation with a pointing device and displays the designated action item in a currently selected folder.

36. A method according to claim 32, wherein the displaying step displays icons representative of a physical response which is executed upon actuation of the action items.

37. A method according to claim 32, wherein the steps of displaying comprises displaying using a file system editor whereby action items may be created, edited, opened, named, copied, or deleted displayed action items.

38. A method according to claim 30, further comprising modifying, in the graphical user interface, the interactive system by manipulating the at least one event-actuatable action item in the graphical user interface.

39. Computer-executable process steps stored on a computer-readable medium, the computer executable process steps being used in an event interpreter executable on a computer having a file system for arranging files in a hierarchical structure of folders, said event interpreter to select action items for execution based on occurrences of events in an interactive system, the computer-executable process steps comprising:
a storing step to store an interactive system application, said interactive system application comprising event identifiers and action items, at least one action item being associated with each event identifier, each of said action items being end user-definable through a graphical user interface and capable of providing, upon being processed, a software or a hardware response or both a hardware and a software response to a detected event, and each of said event identifiers having a text-based description displayable by the file system and corresponding to a name of a file or a folder, in the file system, that is associated with at least one action item, the event identifiers providing a text-based description of an event to which an associated action item is intended to provide a response;

a traversing step to traverse the file system for files or folders associated with the interactive system application;

a gathering step to gather event identifiers in the interactive system application from the file system via an event parser;

a parsing step to parse, via the event parser, the event identifiers into a list of event identifiers and associated action items;

a sending step to send a computer-usable signal indicating that an event has occurred to the event interpreter;

a receiving step to receive the computer-usable signal at an event name generator which generates an event name based on the computer-usable signal; and a comparing step to compare, in an action item selector, the event name to event identifiers in the list of event identifiers and associated action items, wherein, in the case the event name matches an event identifier in the list of event identifiers and associated action items, the computer-executable process steps further comprise a selecting step to select from the file system the file or folder identified by the matched event identifier associated with an action item associated with the event identifier and a processing step to process the selected action item.

40. Computer-executable process steps according to claim 39, wherein the sending step comprises a monitoring step to monitor signals from a plurality of hardware event detectors and to send one of the signals to the event interpreter.

41. Computer-executable process steps according to claim 40, wherein the monitoring step comprises monitoring a telephone system.

42. Computer-executable process steps according to claim 40, wherein the monitoring step comprises monitoring a security and fire detection systems.

43. Computer-executable process steps according to claim 39, further comprising a converting step to convert, via the event name generator, the signal sent from the sending means by mapping the signal to event names in an event-name map.

44. Computer-executable process steps according to claim 39, further comprising a generating step to generate the computer-usable signal via a computer software interface which receives an input signal from a hardware event interface.

45. Computer-executable process steps according to claim 39, further comprising a processing step to process the selected action item and, in accordance with the result of processing, to produce a controlled hardware response signal to the occurrence of the physical event.

46. Computer-executable process steps according to claim 39, further comprising a displaying step to display a graphical user interface which graphically displays the action item, and manipulating and editing steps to manipulate and edit the displayed action item via the graphical user interface.

47. Computer-executable process steps stored on a computer-readable medium according to claim 39, wherein in the case no match can be found in the list for the event name, the computer-executable process steps further comprise an ignoring step to ignore the event.

48. Computer-executable process steps according to claim 39, further comprising a displaying step to display the graphical user interface which graphically displays the action item, and wherein the graphical user interface is used to manipulate and edit a file or folder associated with the displayed action item thereby modifying functionality of the interactive system.

49. Computer-executable process steps stored on a computer-readable medium and executable on a computer having a file system for arranging files in a hierarchical structure of folders, the computer executable process steps to monitor and to respond to events, the computer-executable process steps comprising:

a storing step to store, in the file system, a plurality of action items, each action item being end user-definable through a graphical user interface and corresponding to an event identifier which provides a user with a text-based description of at least one event monitored in the interactive system to which at least one corresponding action item is intended to provide a response, the text-based description being displayable to the user by the file system and corresponding to a name of a file or a folder, in the file system, that is associated with at least one action item;

a traversing step to traverse, in an event parser, the file system for folders and files;

a gathering step to gather, in the event parser, the event identifiers and to parse the event identifiers into a list of event identifiers and corresponding action items;

a detecting step to detect, over an event interface, an occurrence of at least one event and to output a signal in response to the occurrence of an event;

a receiving step to receive, at a name generator, the signal from the event interface and to generate an event name based on the received signal; and a matching step to match, in an event interpreter, the event name to an event identifier in the list of event identifiers and corresponding action items; and selecting and processing steps to select from the file system the file or folder associated with an action item and process the action item from the file system, the action item corresponding to an event identifier matching the generated event name, wherein the action item, upon being processed, provides either a software or a hardware response or both a hardware and a software response to the detected event.

50. Computer-executable process steps according to claim 49, further comprising:

a detecting step to detect a physical event via a physical event detector; and an outputting step to output an event detection signal to the event interface upon the occurrence of the physical event.

51. Computer-executable process steps according to claim 50, further comprising a generating step to generate an event name by mapping the received signal into an event-name map of event names.

52. Computer-executable process steps according to claim 50, wherein the detecting step comprises detecting physical events in a telephone system, and wherein, as a result of the occurrence of the physical event, producing a physical response based on the processed action item.

53. Computer-executable process steps according to claim 50, wherein the detecting step comprises detecting physical events in a security system, and wherein, as a result of the occurrence of the physical event, producing a physical response based on the processed action item.

54. Computer-executable process steps according to claim 49, further comprising creating and editing steps to create and edit action items to be stored in the file system, wherein the creating and editing steps provide event identifiers for each action item by which the action item is actuated.

55. Computer-executable process steps according to claim 49, wherein the action items to be processed include at least one of voice data, text data, and image data.

56. Computer-executable process steps according to claim 55, wherein action items are comprised by a folder, a document, or an application.

57. Computer-executable process step stored on a computer-readable medium according to claim 49, further comprising a modifying step to modify, in the graphical user interface, the interactive system by manipulating a file or folder associated with the at least one event-actuatable action item in the graphical user interface.

58. A method for displaying, in a graphical user interface, a graphical representation of an event-based system in a computer having a file system for arranging files in a hierarchical structure of folders, said method comprising the steps of:
    selecting a folder displayed by the file system and containing at least one event-actuatable action item;
    displaying, within a file system window corresponding to the selected folder, an icon representative of a function of the at least one event-actuatable action item; and
    displaying, in conjunction with the icon, an event identifier corresponding to the at least one event-actuatable action item,
    wherein the event identifier is a filename of the at least one event-actuatable action item, and
    wherein the event identifier provides a text-based description, displayable by the file system, of an event to which the corresponding at least one event-actuatable action item is intended to provide a response, the filename of the event identifier and the corresponding at least one event-actuatable action item being used to define at least part of the event-based system, the at least one event-actuatable action item being end user-definable through the graphical user interface.

59. A method according to claim 58, further comprising the step of designating the displayed icon and, in response to designation, permitting editing of the action item represented by the icon.

60. A method according to claim 58, further comprising the steps of designating the displayed icon and, in response to designation, actuating the action item represented by the icon.

61. The method according to claim 58, further comprising the steps of:
    displaying, within the window corresponding to the selected folder, at least one folder action item; and
    displaying, in conjunction with the folder action item, an event identifier which causes the folder to be accessed.

62. The method according to claim 58, further comprising the steps of:
    displaying, within the window corresponding to the selected folder, at least one folder action item and at least one executable action item representative of an event-actuatable application; and
    displaying, in conjunction with the folder action item and with the executable action item, respective event identifiers which cause the folder to be accessed and the executable action item to be processed.

63. A method according to claim 58, wherein the selected folder contains additional folder action items and action items which represent event-actuatable applications.

64. A method according to claim 58, wherein the displayed action item is a graphical representation of a physical response to the detected event.

65. A method according to claim 58, wherein the displayed identifier is representative of the name of a corresponding actuating event.

66. A method according to claim 58, wherein the steps of displaying comprises displaying a graphical user interface using a file system/presenter editor whereby action items may be created, edited, opened, named, copied, or deleted displayed action items.

67. A method according to claim 58, wherein the displayed window and its contents represent an interactive system.

68. A method according to claim 58, wherein the step of displaying further comprises displaying the graphical user interface wherein functionality of the event-based system is modifiable by manipulating the folder, the at least one action item or both.

69. A method for creating a user-definable interactive system using a tool palette of predefined action items displayed, in a graphical user interface, by a computer having a file system for arranging files in a hierarchical structure of folders, the method comprising the steps of:
    storing a plurality of action items, each of the plurality of action items performing a predetermined task;
    displaying, using the file system, a tool palette of graphical representations corresponding to each of the plurality of action items, each graphical representation displayed with an event identifier which is a filename of a corresponding action item, and which provides a text-based description, displayable by the file system, of an event to which a corresponding action item is intended to provide a response;
    responding to a designation of a plurality of the displayed graphical representations by selecting a plurality of corresponding action items; and
    using the displayed event identifiers to associate the graphical representations of each of the plurality of selected action items, the filename associated with each of the event identifiers and the corresponding action items being used to define at least part of the interactive system, the action items being end user-definable through the graphical user interface.

70. A method according to claim 69, wherein the tool palette and the associated graphical representations of each of the selected action items are displayed in a windowing environment.

71. A method according to claim 69, wherein the responding step responds to a user designation of a graphical representation with a pointing device and displays a selected corresponding action item in a currently selected folder.

72. A method according to claim 69, wherein the displaying step displays icons representative of a physical response which is executed upon actuation of the action items.

73. A method according to claim 69, wherein the steps of displaying comprises displaying using a file system presenter/editor whereby action items may be created, edited, opened, named, copied, or deleted displayed action items.

74. A method according to claim 69, further comprising:
    displaying the tool palette and the associated graphical representations of each of the selected action items in the graphical user interface; and modifying the at least part of the interactive system by manipulating a file or folder associated with the at least one of the selected action items in said graphical user interface.

75. A method for visually representing, in a graphical user interface, content and structure of an interactive system application stored in a computer file system for arranging files in a hierarchical structure of folders, comprising the steps of:

selecting from the file system an interactive system application containing at least one event-actuatable action item;

displaying, in a hierarchical arrangement and using the file system, a-graphical representation of the at least one event-actuatable action item; and displaying, using the file system, an event identifier associated with the displayed graphical representation of the at least one event-actuatable action item, wherein the event identifier is a filename of the at least one event-actuatable action item, and wherein the event identifier provides a text-based description, displayable by the file system, of a physical event to which the associated action item is intended to provide a response, the filename of the event identifier and the associated action item being used to define at least part of an interactive system, the action item being end user-definable through the graphical user interface.

76. A method according to claim 75, further comprising:

displaying the event-actuatable action item and event identifier in the graphical user interface; and modifying the interactive system application by manipulating a file or folder associated with the at least one event-actuatable action item in said graphical user interface.

77. An apparatus for displaying, in a graphical user interface, a graphical representation of an event-based system in a computer having a file system for arranging files in a hierarchical structure of folders comprising:

selection means for selecting a folder displayed by the file system and containing at least one event-actuatable action item; and display means for displaying, within a file system window corresponding to the selected folder, an icon representative of a function of the at least one event-actuatable action item, and for displaying, in conjunction with the icon, an event identifier corresponding to the at least one event-actuatable action item, wherein the event identifier is a filename of the at least one event-actuatable action item, and wherein the event identifier provides a text-based description, displayable by the file system, of an event to which the corresponding at least one event-actuatable action item is intended to provide a response, the filename of the event identifier and the corresponding at least one event-actuatable action item being used to define at least part of the event-based system, the at least one event-actuatable action item being end user-definable through the graphical user interface.

78. An apparatus according to claim 77, wherein functionality of the event-based system is modifiable by manipulating the folder, the at least one action item or both within the graphical user interface displayed by the display means.

79. An apparatus for creating a user-definable interactive system using a tool palette of predefined action items displayed, in a graphical user interface, by a computer having a file system for arranging files in a hierarchical structure of folders, the apparatus comprising:

storage means for storing a plurality of action items, each of the plurality of action items performing a predetermined task;

display means for displaying, using the file system, a tool palette of graphical representations corresponding to each of the plurality of action items, each graphical representation displayed with an event identifier which is a filename of a corresponding action item, and which provides a text-based description, displayable by the file system, of an event to which a corresponding action item is intended to provide a response;

response means for responding to a designation of a plurality of the displayed graphical representations by selecting a plurality of corresponding action items; and associating means for associating graphical representations of each of the plurality of selected action items, using the displayed event identifiers, the filename associated with each of the event identifiers and the corresponding action items being used to define at least part of the interactive system, the action items being end user-definable through the graphical user interface.

80. An apparatus according to claim 79, wherein the tool palette and the associated graphical representations of each of the selected action items are displayed in the graphical user interface wherein the at least part of the interactive system is modifiable by manipulating a file or folder associated with the at least one of the selected action items in said graphical user interface.

81. An apparatus for visually representing, in a graphical user interface, content and structure of an interactive system application stored in a computer file system for arranging files in a hierarchical structure of folders comprising:

selection means for selecting from the file system an interactive system application containing at least one event-actuatable action item; and display means for displaying, in a hierarchical arrangement and using the file system, a graphical representation of the at least one event-actuatable action item, and for displaying, using the file system, an event identifier associated with the displayed graphical representation of the at least one event-actuatable action item, wherein the event identifier is a filename of the at least one event-actuatable action item, and wherein the event identifier provides a text-based description, displayable by the file system, of a physical event to which the associated action item is intended to provide a response, the filename of the event identifier and the associated action item being used to define at least part of the interactive system, the action item being end user-definable through the graphical user interface.

82. An apparatus according to claim 81, wherein the display means displays the event-actuatable action item in the graphical user interface wherein the interactive system application is modifiable by manipulating a file or folder associated with the at least one event-actuatable action item in said graphical user interface.

83. A computer apparatus for displaying, in a graphical user interface, a graphical representation of an event-based system in a computer having a file system for arranging files in a hierarchical structure of folders, comprising:

a memory for storing computer-executable process steps;

a display; and a processor which executes computer-executable process steps stored in the memory (1) to select a folder displayed by the file system and containing at least one event-actuatable action item, (2) to cause said display to display, within a file system window corresponding to the selected folder, an icon representative of a function of the at least one event-actuatable action item, and (3) to cause said display to display, in conjunction with the icon, an event identifier corresponding to the at least one event-actuatable action item, wherein the event identifier is a filename of the at least one event-actuatable action item, and wherein the event identifier provides a text-based description, displayable by the file system, of an event to which the corresponding at least one event-actuatable action item is intended to provide a response, the filename of the event identifier and the corresponding at least one event-actuatable action item being used to define at least part of the event-based system, the at least one event-actuatable action item being end user-definable through the graphical user interface.

84. A computer apparatus according to claim 83, wherein said processor further executes a computer-executable process step to display the graphical user interface wherein functionality of the event-based system is modifiable by manipulating the folder, the at least one action item or both.

85. A computer apparatus for creating a user-definable interactive system using a tool palette of predefined action items displayed, in a graphical user interface, using a file system for arranging files in a hierarchical structure of folders, the apparatus comprising:

a memory for storing computer-executable process steps and for storing a plurality of action items, each of the plurality of action items performing a predetermined task;

a display; and a processor which executes computer-executable process steps stored in the memory (1) to cause said display to display, using the file system, a tool palette of graphical representations corresponding to each of the plurality of action items, each graphical representation displayed with an event identifier which is a filename of a corresponding action item, and which provides a text-based description, displayable by the file system, of an event to which a corresponding action item is intended to provide a response (2) to respond to a designation of a plurality of the displayed graphical representations by selecting a plurality of corresponding action items, and (3) to associate graphical representations of each of the plurality of selected action items, using the displayed event identifiers, the filename associated with each of the event identifiers and the corresponding action items being used to define at least part of the interactive system, the action items being end user definable through the graphical user interface.

86. A computer apparatus according to claim 85, wherein said processor further executes a computer-executable process steps to (1) display the tool palette and the associated graphical representations of each of the selected action items in the graphical user interface, and (2) to modify the at least part of the interactive system by manipulating a file or folder associated with the at least one of the selected action items in said graphical user interface.

87. A computer apparatus for visually representing, in a graphical user interface, content and structure of an interactive system application stored in a file system for arranging files in a hierarchical structure of folders, the apparatus comprising:

a memory for storing computer-executable process steps;

a display; and a processor which executes computer-executable process steps stored in the memory (1) to select from the file system an interactive system application containing at least one event-actuatable action item, (2) to cause said display to display, in a hierarchical arrangement and using the file system, a graphical representation of the at least one event-actuatable action item, and (3) to cause said display to display, using the file system, an event identifier associated with the displayed graphical representation of the at least one event-actuatable action item, wherein the event identifier is a filename of the at least one event-actuatable action item, and wherein the event identifier provides a text-based description, displayable by the file system, of a physical event to which the associated action item is intended to provide a response, the filename of the event identifier and the associated action item being used to define at least part of the interactive system, the action item being end user-definable through the graphical user interface.

88. A computer apparatus according to claim 87 wherein the processor further executes process steps (1) to display the event-actuatable action item and event identifier in the graphical user interface, and (2) to modify the interactive system application by manipulating a file or folder associated with the at least one event-actuatable action item in said graphical user interface.

89. A computer-readable memory medium storing computer-executable process steps for displaying, in a graphical user interface, a graphical representation of an event-based system in a computer having a file system for arranging files in a hierarchical structure of folders, the steps comprising:

a selecting step to select a folder displayed by the file system and containing at least one event-actuatable action item;

a displaying step to display, within a file system window corresponding to the selected folder, an icon representative of a function of the at least one event-actuatable action item; and a displaying step to display, in conjunction with the icon, an event identifier corresponding to the at least one event-actuatable action item, wherein the event identifier is a filename of the at least one event-actuatable action item, and wherein the event identifier provides a text-based description, displayable by the file system, of an event to which the corresponding at least one event-actuatable action item is intended to provide a response, the filename of the event identifier and the corresponding at least one event-actuatable action item being used to define at least part of the event-based system, the at least one event-actuatable action item being end user-definable through the graphical user interface.

90. A computer-readable medium according to claim 89, further comprising:

a displaying step to display the graphical user interface wherein functionality of the event-based system is modifiable by manipulating the folder, the at least one action item or both.

91. A computer-readable memory medium storing computer-executable process steps for creating a user-definable interactive system using a tool palette of pre-defined action items displayed, in a graphical user interface, by a computer having a file system for arranging files in a hierarchical structure of folders, the steps comprising:

a storing step to store a plurality of action items, each of the plurality of action items performing a predetermined task;

a displaying step to display, using the file system, a tool palette of graphical representations corresponding to each of the plurality of action items, each graphical representation displayed with an event identifier which is a filename of a corresponding action item, and which provides a text-based description, displayable by the file system, of an event to which a corresponding action item is intended to provide a response;

a responding step to respond to a designation of a plurality of the displayed graphical representations by selecting a plurality of corresponding action items; and an associating step to associate graphical representations of each of the plurality of selected action items, using the displayed event identifiers, the filename associated with each of the event identifiers and the corresponding action items being used to define at least part of the interactive system, the action items being end user-definable through the graphical user interface.

92. A computer-readable memory medium according to claim 91, wherein the tool palette and the associated graphical representations are displayed in the graphical user interface, the steps further comprising:

a modifying step to modify the at least part of the interactive system by manipulating a file or folder associated with the at least one of the selected action items in said graphical user interface.

93. A computer-readable memory medium storing computer-executable process steps for visually representing, in a graphical user interface, content and structure of an interactive system application stored in a computer file system for arranging files in a hierarchical structure of folders, the steps comprising:

a selecting step to select from the file system an interactive system application containing at least one event-actuatable action item;

a displaying step to display, in a hierarchical arrangement and using the file system, a graphical representation of the at least one event-actuatable action item; and a displaying step to display, using the file system, an event identifier associated with the displayed graphical representation of the at least one event-actuatable action item, wherein the event identifier is a filename of the at least one event-actuatable action item, and wherein the event identifier provides a text-based description, displayable by the file system, of a physical event to which the associated action item is intended to provide a response, the filename of the event identifier and the associated action item being used to define at least part of the interactive system, the action item being end user-definable through the graphical user interface.

94. A computer-readable memory medium according to claim 93, the steps further comprising:

a displaying step to display, in the graphical user interface, the event-actuatable action item and event identifier; and a modifying step to modify the interactive system application by manipulating a file or folder associated with the at least one event-actuatable action item in said graphical user interface.

* * * * *

UNITED STATES PATENT AND TRADEMARK OFFICE
CERTIFICATE OF CORRECTION

PATENT NO. : 6,259,444 B1
DATED : July 10, 2001
INVENTOR(S) : Douglas L. Palmer et al.

It is certified that error appears in the above-identified patent and that said Letters Patent is hereby corrected as shown below:

<u>Title page,</u>
Item [56], References Cited,
U.S. PATENT DOCUMENTS, "Novel, IV et al." should read -- Noble, III et al. --; and OTHER PUBLICATIONS, "Sysems'" should read -- Systems' --.

<u>Column 2,</u>
Line 27, "detecting" should read -- detects --.

<u>Column 7,</u>
Line 20, "english" should read -- English --.

<u>Column 20,</u>
Line 44, "steps" should read -- step --;

<u>Column 21,</u>
Line 42, "systems." should read -- system. --.

<u>Column 24,</u>
Line 10, "comprises" should read -- comprise --;
Line 60, "steps" should read -- step --;

<u>Column 25,</u>
Line 14, "a-graphical" should read -- a graphical --.

<u>Column 27,</u>
Line 59, "a" should be deleted.

<u>Column 28,</u>
Line 26, "claim 87" should read -- claim 87, --.

Signed and Sealed this

Twenty-seventh Day of August, 2002

Attest:

*Attesting Officer*

JAMES E. ROGAN
*Director of the United States Patent and Trademark Office*